United States Patent
Roessler et al.

(10) Patent No.: US 12,450,927 B2
(45) Date of Patent: Oct. 21, 2025

(54) HISTOLOGICAL STAIN PATTERN AND ARTIFACTS CLASSIFICATION USING FEW-SHOT LEARNING

(71) Applicant: Ventana Medical Systems, Inc., Tucson, AZ (US)

(72) Inventors: Christian Roessler, Tucson, AZ (US); Yao Nie, Tuscon, AZ (US); Nazim Shaikh, Tucson, AZ (US); Daniel Bauer, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 407 days.

(21) Appl. No.: 18/169,641

(22) Filed: Feb. 15, 2023

(65) Prior Publication Data

US 2023/0196803 A1    Jun. 22, 2023

Related U.S. Application Data

(63) Continuation of application No. PCT/US2021/046242, filed on Aug. 17, 2021.
(Continued)

(51) Int. Cl.
| | |
|---|---|
| *G06K 9/00* | (2022.01) |
| *G06V 10/74* | (2022.01) |
| *G06V 10/764* | (2022.01) |
| *G06V 10/771* | (2022.01) |
| *G06V 10/82* | (2022.01) |
| *G06V 20/69* | (2022.01) |

(52) U.S. Cl.
CPC .......... *G06V 20/698* (2022.01); *G06V 10/761* (2022.01); *G06V 10/764* (2022.01); *G06V 10/771* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2002/0031255 A1* | 3/2002 | Kasdan | G06V 20/69 382/156 |
| 2017/0109582 A1 | 4/2017 | Kuznetsova et al. | |

(Continued)

FOREIGN PATENT DOCUMENTS

JP       2019091454 A      6/2019

OTHER PUBLICATIONS

"AI Artificial Intelligence Technology, VGG16 Model for Image Recognition of an Original Photograph", Available Online at: https://newtechnologylifestyle.net/vgg16originalpicture/, Feb. 11, 2019, 16 pages.

(Continued)

*Primary Examiner* — SJ Park
(74) *Attorney, Agent, or Firm* — Kilpatrick Townsend & Stockton LLP

(57) ABSTRACT

A method and system for classifying field of view (FOV) images of histological slides into various categories that include certain stain patterns, artifacts, and/or other features of interest are provided herein. Few-shot learning (e.g., a prototypical network) techniques are used to train a deep convolutional neural network using a small number of training samples for a small number of image classes for classifying stain images belonging to a larger number of image classes.

8 Claims, 14 Drawing Sheets

Related U.S. Application Data

(60) Provisional application No. 63/069,421, filed on Aug. 24, 2020.

(56) References Cited

U.S. PATENT DOCUMENTS

| | | | |
|---|---|---|---|
| 2019/0347557 | A1 | 11/2019 | Khan |
| 2020/0096434 | A1* | 3/2020 | Deran .................... G06N 3/08 |
| 2020/0257970 | A1 | 8/2020 | Moon et al. |

OTHER PUBLICATIONS

JP Application No. 2023-513083 , "Office Action", Dec. 1, 2023, 7 pages.

JP Application No. 2023-513083 , "Notice of Allowance", Mar. 5, 2024, 6 pages.

EP Application No. 21769242.5 , "Office Action", Apr. 3, 2025, 6 pages.

Babaie et al., "Deep Features for Tissue-Fold Detection in Histopathology Images", Advances in Databases And Information Systems, Springer International Publishing, Jul. 3, 2019, pp. 125-132.

Medela et al., "Few Shot Learning in Histopathological Images: Reducing the Need of Labeled Data on Biological Datasets", IEEE 16th International Symposium on Biomedical Imaging, Apr. 8, 2019, pp. 1860-1864.

Oreshkin et al., "TADAM: Task Dependent Adaptive Metric for Improved Few-Shot Learning", In Advances in Neural Information Processing Systems; Arxiv.Org, Cornell University Library, 201 Online Library, May 23, 2018, 13 pages.

International Application No. PCT/US2021/046242, "International Search Report and Written Opinion", mailed on Nov. 26, 2021, 14 pages.

Qi et al., "Low-Shot Learning with Imprinted Weights", IEEE/CVF Conference on Computer Vision and Pattern Recognition, Jun. 18, 2018, pp. 5822-5830.

Snell et al., "Prototypical Networks for Few-shot Learning", Available online at: https://arxiv.org/pdf/1703.05175.pdf, Jun. 19, 2017, 13 pages.

Wang et al., "Generalizing from a Few Examples: A Survey on Few-Shot Learning", ACM Computing Surveys, vol. 1, No. 1; Available online at: URL:https://arxiv.org/pdf/1904.05046.pdf>, Mar. 29, 2020, pp. 1-34.

Fukushima, "The Subtype Classification of Malignant Lymphoma Using Domain Adversarial Multi-Instance Learning", The Institute of Electronics, Information and Communication Engineers: Technical Report vol. 119, No. 193, Aug. 28, 2019, pp. 19-24.

JP Application No. 2024-043277, "Notice of Allowance", Oct. 1, 2024, 6 pages.

* cited by examiner

Confusion Matrix of Test Data (n = 70)

Predicted Classification

| Actual Classification | 1 | 2 | 3 | 4 | 5 |
|---|---|---|---|---|---|
| 1 | 64 | 3 | 1 | | 2 |
| 2 | 1 | 59 | 2 | | 8 |
| 3 | 2 | 1 | 57 | 2 | 8 |
| 4 | 3 | 3 | 5 | 52 | 7 |
| 5 | | 1 | 3 | | 66 |

FIG. 12B

Confusion Matrix of Test Data (n = 30)

Predicted Classification

| Actual Classification | 1 | 2 | 3 | 4 | 5 |
|---|---|---|---|---|---|
| 1 | 30 | | | | |
| 2 | | 30 | | | |
| 3 | 1 | | 27 | | 1 |
| 4 | | | | 30 | |
| 5 | | | 2 | | 29 |

FIG. 12A

HISTOLOGICAL STAIN PATTERN AND ARTIFACTS CLASSIFICATION USING FEW-SHOT LEARNING

CROSS-REFERENCE TO RELATED APPLICATION

This application is a continuation of International Application No. PCT/US2021/046242, filed on Aug. 17, 2021, which claims the benefit of and the priority to the U.S. Provisional Application No. 63/069,421, filed on Aug. 24, 2020, each of which is hereby incorporated by reference in their entireties for all purposes.

BACKGROUND

Histology is the microscopic study of animal and plant cells, tissues, or other biological samples through sectioning, staining, and examining under an electron or light microscope. Histological studies can be used in forensic investigations, autopsy, diagnosis, and education. Histology is also used extensively in medical fields to facilitate diagnosis, prognosis predictions and treatment selections.

Staining techniques are widely used in histology and fields of histopathology, hematology, and cytopathology to enhance the contrast of specific types of biological objects in the biological samples at the microscopic level. For example, hematoxylin and eosin (H&E) stains are used as diagnostic stains for evaluating tissue morphology, nuclear, and cytoplasmic features in tissue sections. The staining process generally involves adding a class-specific dye (e.g., for DNA, proteins, lipids, carbohydrates, etc.) to a section of a sample to qualify or quantify the presence of a specific compound, structure, or feature. For example, stains can help to identify or highlight biological tissues (e.g., muscle fibers or connective tissues), cell populations (e.g., different blood cells), or organelles within individual cells. Biological staining can also be used to mark cells in flow cytometry, to flag proteins or nucleic acids in gel electrophoresis, and the like.

In addition, Immunohistochemistry (IHC) slide staining is a staining technique utilized to identify proteins in cells of a tissue section and hence is widely used in the study of different types of cells, such as cancerous cells and immune cells in biological tissue. Thus, IHC staining may be used in research to understand the distribution and localization of the differentially expressed biomarkers of immune cells (such as T-cells or B-cells) in a cancerous tissue for an immune response study. For example, tumors may contain infiltrates of immune cells, which may prevent the development of tumors or favor the outgrowth of tumors.

Histological staining includes a series of processes to prepare a sample (e.g., tissues) for microscope study by staining each of one or more sections of a sample using one or more histological stains. The histological staining processes generally include fixation, processing, embedding, sectioning, and staining. Various types of artifacts or other artificial effects may be introduced into the sample during each stage of the histological staining processes. The artifacts and other artificial effects may affect the degree to which various biological objects can be detected and/or characterized (e.g., to identify a quantity of the objects, a size of one or more objects and/or a shape of one or more objects). Thus, an artifact may affect a degree to which a pathology image may inform a diagnosis, prognosis and/or treatment selection.

SUMMARY

Some embodiments of the present disclosure are directed to, among other things, biological sample preparation and analysis, such as digital pathology. More specifically, disclosed herein are techniques for classifying field of view (FOV) images of histological slides into various categories that include certain stain patterns, artifacts, and/or other features of interest. According to certain embodiments, few-shot learning and transfer learning techniques are used to train a deep convolution neural network (e.g., a prototypical network) using a small number of training samples depicting a small number of feature classes (e.g., different types of artifacts). The trained deep convolutional neural network can then be used for classifying stain images belonging to a larger number of feature classes. Techniques disclosed herein outperform existing methods based merely on transfer learning techniques. Techniques disclosed herein can be used to classify cell types or other target biological objects (e.g., mitosis, debris, vessels, etc.) in FOV images. Various embodiments are described herein, including devices, systems, modules, materials, methods, non-transitory computer-readable storage media storing programs, code, or instructions executable by one or more processors, and the like.

According to certain embodiments, a computer-implemented method of training a machine-learning model for classifying stain images or other images is provided. The computer-implemented method may include accessing a pre-trained machine-learning model. The pre-trained machine-learning model may include a set of parameter values corresponding to a set of parameters, in which the set of parameter values were learned using a first training data set. The first training data set may include a plurality of images and a corresponding set of classifications, and each classification of the set of classifications may characterize a depiction in a corresponding image of the plurality of images. In some instances, for each image of at least 50% of the plurality of images, the image depicts macroscopic objects.

The computer-implemented method may also include accessing a set of digital pathology images and a corresponding set of artifact classifications. Each digital pathology image of the set of digital pathology images may depict a stained section of a sample and may also include an artifact. In some instances, a digital pathology image of the set of digital pathology images depicts a tissue section stained using an IHC staining protocol or an H&E staining protocol. For each digital pathology image of the set of digital pathology images, the digital pathology image may depict microscopic objects.

Each artifact classification of the set of artifact classifications may indicate a type of artifact corresponding to the artifact, and the set of classifications of the first training data set may be different than the set of artifact classifications. In some instances, a number of artifact classifications of the set of artifact classifications is less than a number of classifications of the first training data set. In some instances, a particular artifact classification of the set of artifact classifications indicates that a corresponding digital pathology image does not include an artifact.

The computer-implemented method may also include using few-shot learning to further train the pre-trained machine-learning model using the set of digital pathology images and the corresponding set of artifact classifications. The further training of the pre-trained machine-learning model may generate a new set of parameter values for the set of parameters. In some instances, the further training of the pre-trained machine-learning model includes generating, for each artifact classification of the set of artifact classifications, a similarity metric using the new digital pathology image and a representation of the artifact classification. The representation of the artifact classification may be generated based on a subset of the set of digital pathology images associated with the artifact classification.

The computer-implemented method may also include receiving a new digital pathology image and processing the new digital pathology image using the further trained machine-learning model to generate an output predicting that the new digital pathology image includes a particular type of artifact. In some instances, the set of artifact classifications corresponding to the set of digital pathology images used to further train the pre-trained machine-learning model does not include the particular type of artifact.

According to certain embodiments, a computer-implemented method of classifying a query image using a machine-learning model and a set of support images is provided. The computer-implemented method may include obtaining a machine-learning model, a set of support images for a first stain image class of a first set of stain image classes, and an unclassified query image. The set of support images for the first stain image class may include a common type of stain artifacts. The machine-learning model may include a VGG network, an Inception network, a Residual Neural Network (ResNet), a Dense Convolutional Network (DenseNet), or a DenseNet-121 network.

The computer-implemented method may also include generating, based on the machine-learning model, a respective embedding of each support image of the set of support images.

The computer-implemented method may also include calculating a prototype for the first stain image class based on the embeddings of the set of support images. The prototype for the first stain image class may include an embedding representing the first stain image class. The computer-implemented method may also include generating, based on the machine-learning model, an embedding of the unclassified query image.

The computer-implemented method may also include determining a similarity metric between the embedding of the unclassified query image and the prototype for the first stain image class. The similarity metric may include a Manhattan distance, an Euclidean distance, a Chebyshev distance, a Hamming distance, or a cosine similarity. In some instances, the embedding and the prototype are encoded in a multi-dimensional embedding space, and a distance between the embedding and the prototype encoded within the multi-dimensional embedding space is identified.

The computer-implemented method may also include classifying the unclassified query image based on the similarity metric. Classifying the unclassified query image may include determining that the similarity metric is greater than a predetermined threshold. In response to determining that the similarity metric is greater than the predetermined threshold, the unclassified query image may be classified as being associated with an image class that is different from the first image class. The unclassified query image can also be classified based on a set of similarity metrics. A respective similarity metric of the set of similarity metrics can be determined between the embedding of the unclassified query image and a prototype for each remaining stain image class of the first set of stain image classes.

The computer-implemented method may also include tuning parameters of the machine-learning model, which includes accessing training images belonging to a second set of stain image classes, selecting a subset of stain image classes from the second set of stain image classes, and tuning the parameters based on results of classifying a set of query images in each stain image class of the subset of stain image classes. In some instances, the first stain image class is not included in the second set of stain image classes. A number of stain image classes in the subset of stain image classes may be less than a number of stain image classes in the first set of stain image classes.

To classify the set of query images for tuning the parameters of the machine-learning model, similarity metrics between embeddings of the set of query images and prototypes of the subset of stain image classes can be calculated. In some instances, a prototype of each stain image class of the subset of image classes is calculated based on embeddings generated from a set of support images selected from the stain image class. The prototype for the first stain image class may be a mean, median, or center of the embeddings of the set of support images.

Tuning the parameters of the machine-learning model may include tuning parameters of a fully connected layer of a pre-trained deep neural network, in which the pre-trained deep neural network may be trained using images that do not include stain images.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. These illustrative examples are mentioned not to limit or define the disclosure, but to provide examples to aid understanding thereof. Additional embodiments and examples are discussed in the Detailed Description, and further description is provided there. The subject matter should be understood by reference to appropriate portions of the entire specification of this disclosure, any or all drawings, and each claim.

The foregoing, together with other features and embodiments will become more apparent upon referring to the following specification, claims, and accompanying drawings.

BRIEF DESCRIPTION OF THE FIGURES

Features, embodiments, and advantages of the present disclosure are better understood when the following Detailed Description is read with reference to the following figures.

FIGS. 12A and 12B show an example of a confusion matrices that respectively identify performance results of a trained machine-learning model for classifying stain images according to certain embodiments.

DETAILED DESCRIPTION

Figure 1:
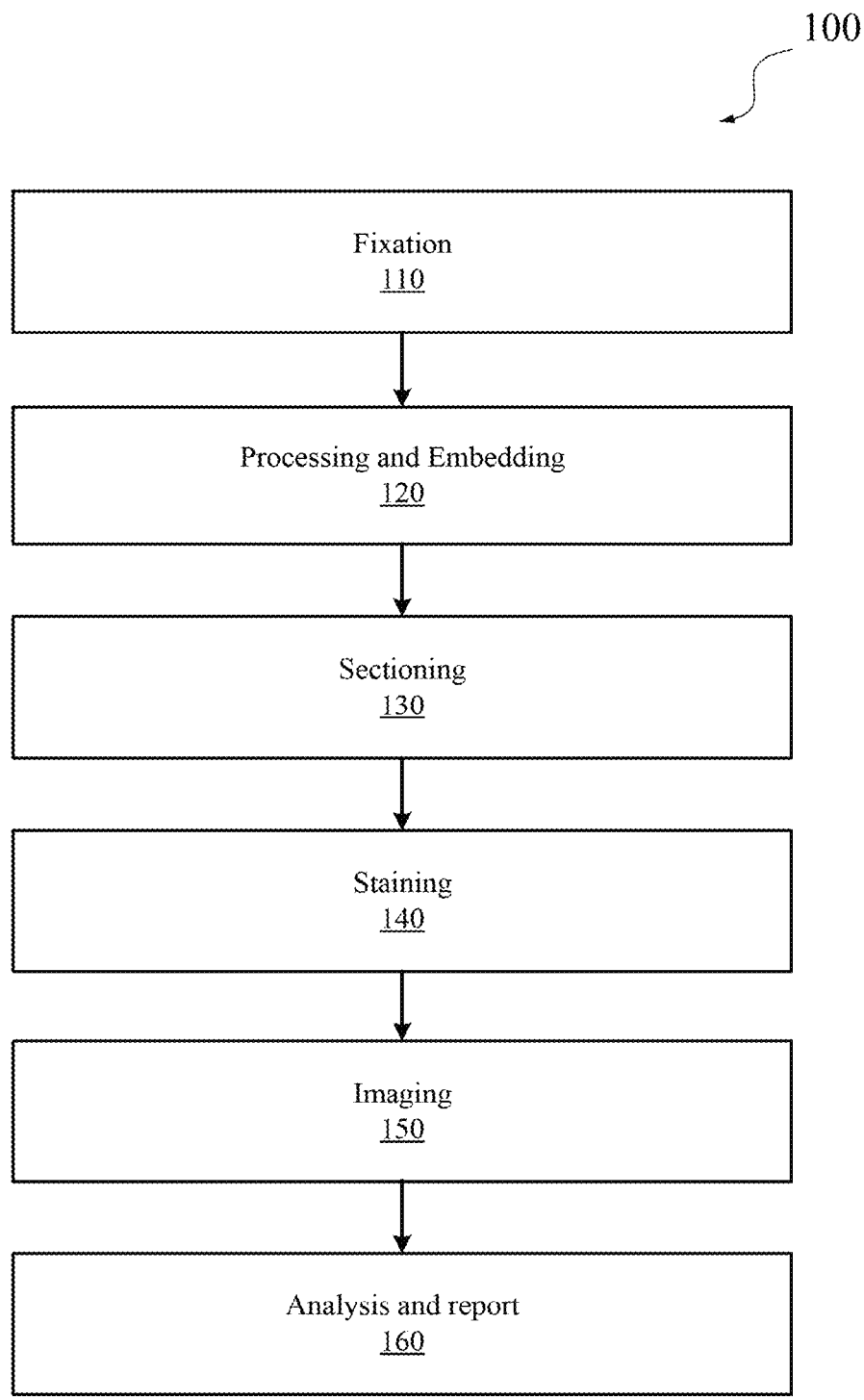
FIG. 1 illustrates an example of a histological staining process.

Techniques disclosed herein relate generally to biological sample preparation and analysis. More specifically, disclosed herein are techniques for classifying field of view (FOV) images of histological slides into various categories that include certain stain patterns, artifacts, and other features of interest. According to certain embodiments, few-shot learning and transfer learning techniques are used to train a machine-learning model (e.g., a prototypical network) using a small number (e.g., less than 100, less than 50, less than 25 or less than 15, such as about 5 to 10) of training samples belonging to each feature class of a small number of feature classes (e.g., a particular protein, different stain patterns, artifacts, and other features of interest). The trained machine-learning model can then be used for classifying stain images belonging to a larger number of feature classes. Various inventive embodiments are described herein, including devices, systems, materials, methods, non-transitory computer-readable storage media storing programs, code, or instructions executable by one or more processors, and the like.

Histological staining is widely used in the digital pathology workflow to highlight features of interest (e.g., tumor nuclei for H&E stains, target proteins for IHC stains) in sectioned tissues or cells on histological slides and to enhance the contrast of the features of interest. For example, in tumor-containing samples, staining can help to efficiently localize pathological cells and their micro environments, thereby facilitating more accurate medical diagnosis. In another example, the IHC staining, such as 3,3'-diaminobenzidine (DAB) staining, can be used to identify presence or distribution of biomarkers within a tissue section depicted in a specimen slide. The identified biomarkers can then be analyzed to facilitate diagnosis of tumor tissues (for example). In some instances, the IHC is used to identify different specific proteins considered as antigens (e.g., a programmed death-ligand 1 (PD-L1)), primary antibodies (e.g., an anti-PD-L1 antibody), and secondary antibodies. However, stained sample sections on histological slides may have various types of issues that hamper the information that can be conveyed. For example, a stained section may be torn or folded, and/or a slide may include one or more water marks. Additionally, part of an image of a stained section may be sub-optimal (e.g., blurred). Such issues are examples of "artifacts", in that a part of the image is depicting something not representative of the sample. To accurately analyze the slide images, it may be desirable to detect such artifacts or other artificial effects, and, if possible, to perform image processing that improve the extent to which the image conveys accurate information about a subject, such that interpretations (e.g., pathological diagnosis, prognosis and/or treatment selection can be improved). To this end, currently, digital-pathology images are frequently evaluated by a human pathologist to assess quality (e.g., of the image, of the section and/or in general) before the images of the stained sample sections are analyzed (e.g., to detect and/or characterize particular biological objects or particular biomarkers in the stained sample sections). If the quality of the stained sample sections is poor, the corresponding digital pathology image may be discarded from a digital-pathology analysis performed for a given subject. However, evaluating stain quality and detecting artifacts in the stain images can be both subjective and time-consuming.

Machine-learning techniques, such as convolutional neural network (CNN) models, have been applied successfully in image classification, object detection and recognition, video action recognition, and the like. CNN models efficiently implement spatial locality and weight-sharing by reusing local filters to extract features from localized regions (also referred to as receptive fields). In order to achieve an accurate CNN model, a large number of samples are often used to train the neural network. However, for digital pathology, extensively labeled datasets may be unavailable, or it may be expensive and time-consuming to build such a dataset, given the expertise required to manually analyze and annotate (e.g., classify and label) images.

According to certain embodiments, a few-shot learning technique is used to train a machine-learning model (e.g., a neural network) for classifying FOV images of histological slides into various image classes that include certain stain patterns, artifacts, and other features of interest. The machine-learning model may include a convolutional neural network (e.g., a deep neural network such as a Dense Convolutional Network) that includes one or more fully connected layers. The one or more fully connected layers of the machine-learning model may be trained in multiple iterations (referred to as episodes) using the few-shot learning technique and a small number of training samples (e.g., stain images) for each image class of multiple (e.g., M) image classes corresponding to different types of features (e.g., artifacts).

In one example, in each training iteration, K (K<=M) image classes may be selected (e.g., randomly selected or pseudorandomly selected) from the M image classes. From the training images belonging to each image class of the K image classes, the training images may be separated (e.g., using a random or pseudorandom technique) into N "support" images and Q "query" images. The quantity of support images (N) may equal number of shots in the few-shot learning technique being implemented and may be (for example) less than 200, less than 100, less than 50, less than 25, less than 20 or less than 15 (e.g., about 5-10). Each support image of the N support images for each image class of the K image classes may be passed to the machine-learning model, which may encode the support image into a corresponding embedding (e.g., a multi-dimensional vector) in a multi-dimensional embedding space (alternatively referred herein as "multi-dimensional space"). The mean (or median) of the N embeddings of the N support images for each image class may be computed to determine a prototype that represents the image class. Each query image of the Q query images may also be encoded by the same machine-learning model into a corresponding embedding. A similarity metric (e.g., a distance or similarity) between the embedding of the query image and the prototype of each image class in the multi-dimensional space may be determined. The query image may then be classified as belonging to an image class the prototype of which is closest to the embedding of the query image. The loss (e.g., classification errors) may be calculated based on the results of the classification of the query images. The loss may then be back-propagated to the preceding layers of the machine-learning model to adjust the parameters of the machine-learning model, such as the parameters (e.g., weights) of the fully connected layers. The above training process (an episode) may be performed for multiple iterations using, for example, the Adam optimizer with a certain learning rate.

Techniques disclosed herein may train a machine-learning model (e.g., a deep convolution neural network, such as a prototypical neural network) for image classification using a few training samples from a small number of known image classes. Thus, techniques disclosed herein may be suitable for use in cases where only a limited number of annotated samples are available.

Knowledge learned from the limited number of training samples of the small number of image classes may be transferred to classify query samples of other image classes, such as digital pathology images with artifacts not in the small number of image classes used in the training phase for training the machine-learning model. For example, the trained machine-learning model can be used to identify presence of new classes in query images (e.g., new biomarkers, new biological objects, other types of artifacts) by computing relationship scores (e.g., distances or similarity) between the query images and a few samples of each new image class without retraining the machine-learning model.

Moreover, techniques disclosed herein can outperform existing methods that are based merely on transfer learning in the classification accuracy, and thus may be used to more accurately identify stain images with artifacts or other defects, which may in turn improve the accuracy of the sample analysis and diagnosis. Techniques disclosed herein may further be used to qualitatively or quantitatively determine the quality of a stain image. Techniques disclosed herein may also be used to classify cells types (e.g., tumor cells, fetal cells in maternal plasma) or other target biomarkers (e.g., PD-L1, Alpha fetoprotein, Cytokeratins) in the FOV images.

As used herein, the term "neural network" refers to one or more computer-implemented networks capable of being trained to achieve a goal. Unless otherwise indicated, references herein to a neural network include one neural network or multiple interrelated neural networks that are trained together. Examples of neural networks include, without limitation, convolutional neural networks (CNNs), recurrent neural networks (RNNs), fully connected neural networks, encoder neural networks (e.g., "encoders"), decoder neural networks (e.g., "decoders"), dense-connection neural networks, and other types of neural networks. In some embodiments, a neural network can be implemented using special hardware (e.g., GPU, tensor processing units (TPUs), systolic arrays, single instruction multiple data (SIMD) processor, etc.), using software code and a general purpose processor, or a combination of special hardware and software code.

As used herein, the term "layer" or "network layer" refers to an analysis stage in a neural network. Layers perform different types of analysis related to the type of the neural network. For example, layers in an encoder may perform different types of analysis on an input image to encode the input image. In some cases, a particular layer provides features based on the particular analysis performed by that layer. In some cases, a particular layer down-samples a received image. An additional layer performs additional down-sampling. In some cases, each round of down-sampling reduces the visual quality of the output image, but provides features based on the related analysis performed by that layer.

As used herein, the term "embedding" refers to a low-dimensional vector into which a high-dimensional vector may be encoded or translated. In the context of neural networks, an embedding is a mapping of a discrete (e.g., categorical) object or variable (e.g., an image or a word) to a vector in a continuous low-dimensional space to represent the discrete object. In some cases, an embedding may be a feature vector or a feature map extracted by a neural network or encoder from a large input feature map. Embeddings can reduce the dimensionality of categorical variables and meaningfully represent categories in the transformed space. Embeddings can be used to find nearest neighbors in the embedding space. Embeddings can be used to make recommendations based on cluster categories, can be used as input to a machine-learning model for a supervised task, and can be used to visualize concepts and relations between categories.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

I. Tissue Preparation and Analysis

Histological staining is widely used to highlight features of interest and enhance contrast in sectioned tissues or cells of a biological sample. In tumor-containing samples, histological staining may help to efficiently localize pathological cells and their micro environments, thereby facilitating better medical diagnosis and treatment. For example, a dye may be applied on the posterior and anterior borders of a sample tissue to locate the diseased or tumorous cells or other pathological cells. In biological studies, staining may be used to mark cells and to flag nucleic acids, proteins, or the gel electrophoresis to aid in the microscopic examination. The process of histological staining may include several stages, such as fixation, processing, embedding, sectioning, staining, and imaging.

In some embodiments, an IHC staining of tissue sections is a type of histological staining used to identify presence of proteins in the biological sample. For example, expression level of a particular protein (e.g., an antigen) is determined by: (a) performing an IHC analysis of a tumor sample with a particular antibody type; and (b) determining the presence and/or expression level of the protein in the sample. In some embodiments, IHC staining intensity is determined relative to a reference determined from a reference sample (e.g., a control cell line staining sample, a tissue sample from non-cancerous patient, a reference sample known to have a pre-determined level of protein expression).

FIG. 1 illustrates an example of a histological staining process 100. Stage 110 of histological staining process 100 may include tissue fixation, which may be used to preserve the tissue and slow down tissue degradation. In histology, fixation generally refers to an irreversible process of using of chemicals to retain the chemical composition, preserve the natural tissue structure, and maintain the cell structure from degradation. Fixation may also harden the cells or tissues for sectioning. Fixatives may enhance the preservation of tissues and cells using cross-linking proteins. The fixatives may bind to and cross-link some proteins, and denature other proteins through dehydration, which may harden the tissue and inactivate enzymes that might otherwise degrade the tissue. The fixatives may also kill bacteria. The fixatives may be administered, for example, through perfusion and immersion of the prepared tissue. Various fixatives may be used, including Bouin fixatives and formaldehyde fixatives, such as neutral buffered formalin (NBF) and paraffin-formalin (paraformaldehyde-PFA). While the fixing process may serve to preserve the structure of the tissues and cells for the purpose of histological studies, the tissue fixation may result in concealing of tissue antigens thereby decreasing antigen detection. Thus, the tissue fixation is generally considered as a limiting factor for IHC because formalin can cross-link antigens and mask epitopes. In some instances, an additional process is performed to reverse the effects of cross-linking, including treating the formalin-fixed tissues with citraconic anhydride (a reversible protein cross-linking agent) and heating.

Stage 120 of histological staining process 100 may include tissue processing and embedding. Tissue processing may take an animal or human tissue after fixation to a state where the tissue is completely infiltrated with a suitable histological wax, such as paraffin wax. The histological wax may not be soluble in water or alcohol, but may be soluble in a paraffin solvent, such as xylene. Therefore, the water in the tissue may need to be replaced with xylene. To do so, the tissue may be dehydrated first by gradually replacing water in the sample with alcohol, which can be achieved by passing the tissue through increasing concentrations of ethyl alcohol (e.g., from 0 to about 100%). After the water is replaced by alcohol, the alcohol may be replaced with xylene, which is miscible with alcohol. Tissue embedding may include embedding the tissue in warm paraffin wax. Because the paraffin wax may be soluble in xylene, the melted wax may fill the space that is filled with xylene and was filled with water before. The wax filled tissue may be cooled down to form a hardened block that can be clamped into a microtome for section cutting. In some cases, deviation from the above example procedure results in an infiltration of paraffin wax that leads to inhibition of the penetration of antibody, chemical, or other fixatives.

Stage 130 of histological staining process 100 may include tissue sectioning. Tissue sectioning is the process of cutting thin slices of a sample from an embedding block for the purpose of mounting it on a microscope slide for examination. Tissue sectioning may be performed using a microtome. In some cases, tissues can be frozen rapidly in dry ice or Isopentane, and can then be cut in a refrigerated cabinet (e.g., a cryostat) with a cold knife. Other types of cooling agents can be used to freeze the tissues, such as liquid nitrogen. The tissue sections for use with light microscopy are generally on the order of 4-10 μm thick. In some cases, sections can be embedded in an epoxy or acrylic resin, which may enable thinner sections (e.g., <2 μm) to be cut. The tissue sections may be placed on glass slides.

Stage 140 of histological staining process 100 may include tissue section staining. The purpose of staining is to identify different tissue components through the color reactions. Most cells are colorless and transparent. Therefore, histological sections may need to be stained to make the cells visible. The staining process generally involves adding a dye or stain to a sectioned sample to qualify or quantify the presence of a specific compound, a structure, a molecule, or a feature (e.g., a subcellular feature). For example, stains can help to identify or highlight specific biomarkers (e.g., PD-L1) from the tissue section image. In other example, stains can be used to identify or highlight biological tissues (e.g., muscle fibers or connective tissue), cell populations (e.g., different blood cells), or organelles within individual cells. Many staining solutions are aqueous. Thus, to stain the sections, the wax may need to be dissolved and replaced with water (rehydration) before a staining solution is applied to a section. For example, the section may be sequentially passed through xylene, decreasing concentration of ethyl alcohol (from about 100% to 0%), and water. Once stained, the sections may be dehydrated again and placed in xylene. The section may then be mounted on microscope slides in a mounting medium dissolved in xylene. A coverslip may be placed on top to protect the sample section. The evaporation of xylene around the edges of the coverslip may dry the mounting medium and bond the coverslip firmly to the slide.

Various types of staining protocols may be used to perform the tissue staining. For example, an IHC staining protocol include using a hydrophobic barrier line around the tissue section to prevent leakage of reagents from the slide during incubation, treating the tissue section with reagents to block endogenous sources of nonspecific staining (e.g., enzymes, free aldehyde groups, immunoglobins, other irrelevant molecules that can mimic specific staining), incubating the tissue section with a permeabilization buffer to facilitate penetration of antibodies and other staining reagents into the tissue, incubating the tissue section with a primary antibody for a period of time (e.g., 1-24 hours) at a particular temperature (e.g., room temperature, 6-8° C.), rinsing the tissue section using wash buffer, incubating the tissue section with a secondary antibody for another period of time at another particular temperature (e.g., room temperature), rinsing the tissue section again using water buffer, incubating the rinsed tissue section with a chromogen (e.g., DAB), and washing away the chromogen to stop reaction. In some instances, counterstaining is subsequently used to identify an entire "landscape" of the tissue section and serve as a reference for the main color used for the detection of tissue targets. Examples of the counterstains may include hematoxylin (stains from blue to violet), Methylene blue (stains blue), toluidine blue (stains nuclei deep blue and polysaccharides pink to red), nuclear fast red (also called Kernechtrot dye, stains red), and methyl green (stains green); non-nuclear chromogenic stains, such as eosin (stains pink), etc. A person of ordinary skill in the art will recognize that other IHC staining techniques can be implemented to perform tissue section staining.

In another example, an H&E staining protocol can be performed for the tissue section staining. The H&E staining protocol includes applying the tissue section with hematoxylin stain mixed with a metallic salt, or mordant. The tissue section can then be rinsed in a weak acid solution to remove excess staining (differentiation), followed by bluing in mildly alkaline water. After the application of hematoxylin, the tissue can be counterstained with eosin. It will be appreciated that other H&E staining techniques can be implemented.

In some embodiments, various types of stains can be used to perform tissue staining, depending on which features of interest is targeted. For example, DAB can be used for various tissue sections for the IHC staining, in which the DAB results a brown color depicting a feature of interest in the stained image. In another example, alkaline phosphatase (AP) can be used for skin tissue sections for the IHC staining, since DAB color may be masked by melanin pigments. With respect to primary staining techniques, the applicable stains may include, for example, basophilic and acidophilic stains, hematin and hematoxylin, silver nitrate, trichrome stains, and the like. Acidic dyes may react with cationic or basic components in tissues or cells, such as proteins and other components in the cytoplasm. Basic dyes may react with anionic or acidic components in tissues or cells, such as nucleic acids. As noted above, one example of a staining system is H&E. Eosin may be a negatively charged pink acidic dye, and hematoxylin may be a purple or blue basic dye that includes hematein and aluminum ions. Other examples of stains may include periodic acid-Schiff reaction (PAS) stains, Masson's trichrome, Alcian blue, van Gieson, Reticulin stain, and the like. In some embodiments, different types of stains may be used in combination.

Stage 150 of histological staining process 100 may include medical imaging to examine the stained tissue in a slide using an electron or optical microscope. In some cases, the examination may include gross examination before the microscopic examination. Gross examination may help a pathologist identify the cells or tissues that have lumps (possibly cancer), and microscopic examination may be used to confirm. The microscope may magnify the images of the tissues to reveal details of the tissues. For example, optical microscopes may have a resolution less than 1 μm, such as about a few hundred nanometers. To observe finer details in nanometer or sub-nanometer ranges, electron microscopes may be used.

At stage 160, the images of the stained sections may be analyzed and the result may be reported. The analysis may be qualitative analysis or quantitative analysis. In histopathology, the stain images may be analyzed to identify signs of diseases, understand the biological mechanisms of the disease process, and the like. For example, immunohistochemistry (IHC) histology may be used to detect the presence of specific protein markers that can assist in accurate tumor classification and diagnosis. In cytology, the stain images may be used to study the structure, function, and chemistry of cells, the presence of isolated cells and cell clusters, the absence of more complicated structures such as glands, and the like.

The histological staining process described above may introduce various alterations to normal morphologic and cytological features due to the presence of various artifacts. As used herein, the term "artifact" may refer to an artificial structure or tissue alteration in a prepared microscopic slide as a result of an extraneous factor. Artifacts may occur during, for example, surgical removal, fixation, tissue processing, embedding, sectioning, staining, and mounting procedures. Artifacts in histopathology may include, for example, pre-fixation artifacts, fixation artifacts, artifacts related to bone tissue, tissue-processing artifacts, artifacts related to microtomy, artifacts related to floatation and mounting, staining artifacts, mounting artifacts, biological artifacts, imaging artifacts, and the like.

For example, pre-fixation artifacts may include injection artifacts, squeeze artifacts (e.g., tissue tear or tissue folds), Fulguration artifacts, starch artifacts, autolysis artifacts, and the like. Fixation artifacts may include, for example, formalin pigments, mercury pigments, ice-crystal artifacts, freezing artifacts, streaming artifacts, and the like. Artifacts related to floatation and mounting may include, for example, folds and wrinkles in section, contaminations, air bubbles, and the like. Staining artifacts may include, for example, residual wax, artifacts related to addition of acetic acid to eosin, artifacts due to mordent of hematoxylin, artifacts due to fluorescent sheen of hematoxylin, and the like. Mounting artifacts may include, for example, residual water and air bubbles.

Figure 2A:
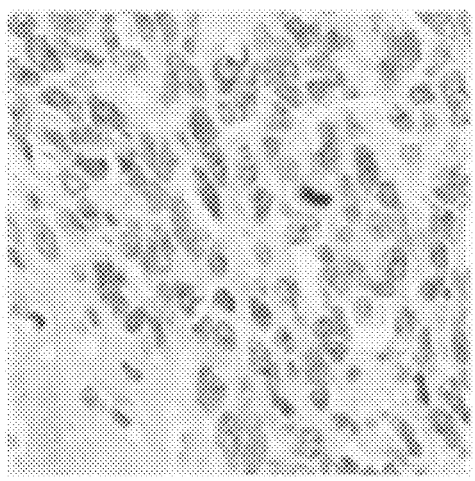
FIGS. 2A-2F illustrate examples of histopathological images.
Figure 2B:
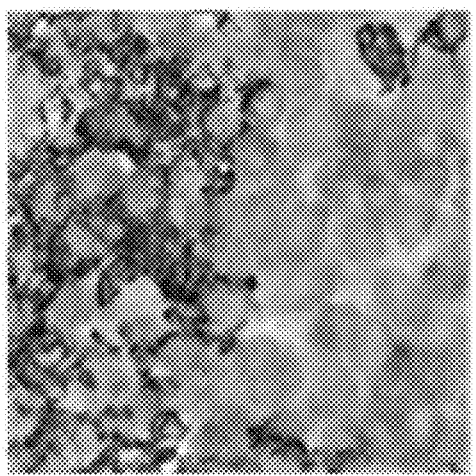
Figure 2C:
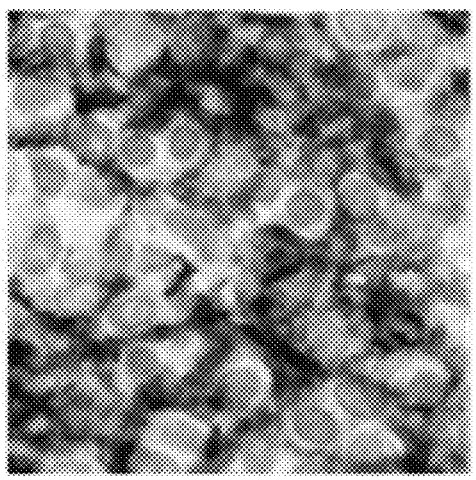
Figure 2D:
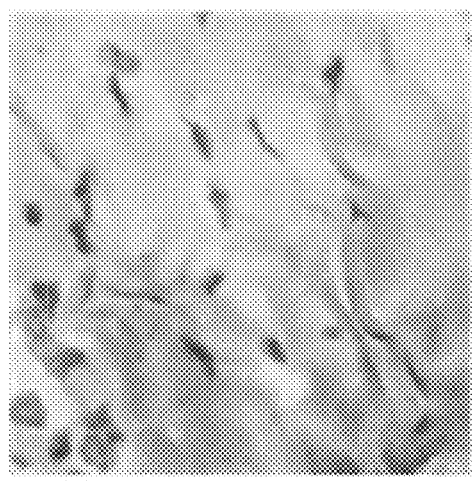
Figure 2E:
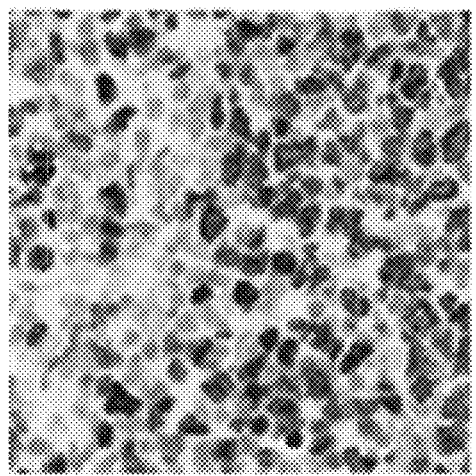
Figure 2F:
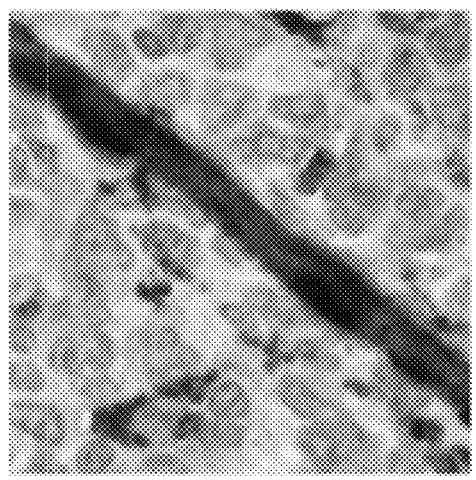

FIGS. 2A-2F illustrate examples of histopathological stain images. FIG. 2A shows an example of an image of a tissue stained with hematoxylin. FIG. 2B illustrates an example of an image of a tissue with water marks. FIG. 2C illustrates an example of an image of a tissue with membrane/cytoplasmic stain. FIG. 2D illustrates an example of a stain image having non-specific staining of connective fibers or stromal elements. FIG. 2E illustrates an example of an image of a nuclear stain. FIG. 2F shows an example of an image with a tissue fold.

The artifacts may lead to a low quality of images of the stained sample sections, which may cause a misdiagnosis or delay in diagnosis. For example, multiple artifacts (e.g., out of focus, water marks, and tissue folds) present in an image of a stained sample may potentially obscure the diagnostic features. These artifacts may even lead to complete uselessness of the tissue. To accurately analyze the slide images, it may be desirable to detect such artifacts or other artificial effects in the slide images, and, if possible, to treat the slide images in a way such that the artifacts and other artificial effects would not interfere with the pathological diagnosis. However, evaluating stain image quality and detecting artifacts from the stain images can be both subjective and time-consuming.

II. Machine-Learning Model

Machine-learning techniques, such as CNN models, have been applied successfully in image classification, object detection and recognition, video action recognition, and the like. CNN models efficiently implements spatial locality and weight-sharing by reusing local filters to extract features from localized regions. A convolutional neural network may perform operations including, for example, convolution, non-linearity (or activation) function (e.g., ReLU), pooling or sub-sampling, and classification. Different CNNs may have different combinations of these main operations, as well as other additional operations. For example, a Residual Neural Network (ResNet) network may include network layers that include mostly convolution layers and a few pooling layers, and may also perform residue-add operations for residue learning.

Figure 3:
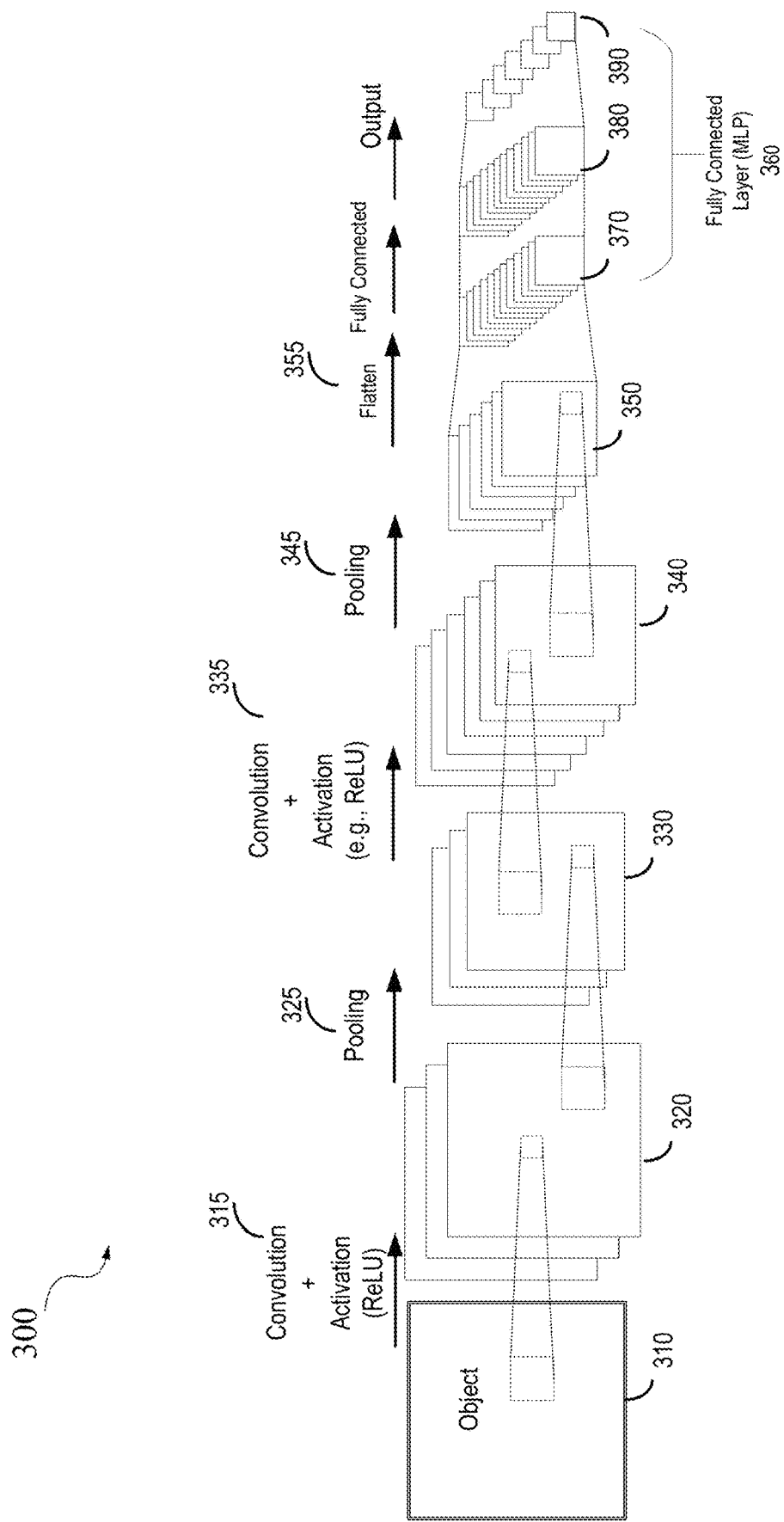
FIG. 3 illustrates an example of a convolutional neural network (CNN) for image or other object classification.

FIG. 3 illustrates an example of a CNN 300 for image or other object classification. As described above, CNN 300 may perform operations including convolution, non-linearity (or activation) function, pooling or sub-sampling, and classification. An object 310 to be classified, such as one or more input images or other input datasets (referred to as input feature maps), may be represented by a matrix of pixel values. For example, object 310 may include multiple channels (e.g., multiple input feature maps), each channel representing a certain component of object 310. For example, a color image from a digital camera or microscope may have a red channel, a green channel, and a blue channel, where each channel may be represented by a matrix of pixels having pixel values in the range of, for example, 0 to 255 (i.e., 8-bit). A gray-scale image may have only one channel. In the following description, the processing of a single image channel using CNN 300 is described. Other channels may be processed similarly.

As shown in FIG. 3, object 310 (e.g., an input image) may first be processed by a first convolution layer 315 using a first set of filters, where first convolution layer 315 may perform a convolution between a matrix representing the input image and a matrix representing each filter in the first set of filters. The convolution may include multiple matrix multiplication. First convolution layer 315 may also perform a non-linear activation function (e.g., ReLU). An output matrix 320 from first convolution layer 315 may have smaller dimensions than the input image. First convolution layer 315 may perform convolutions on the input image using the first set of filters to generate multiple output matrices 320, which may be referred to as output feature maps of first convolution layer 315. The number of filters used may be referred to as the depth of the convolution layer. In the example shown in FIG. 3, first convolution layer 315 may have a depth of three. Each output matrix 320 (e.g., an output feature map) may be passed to a pooling layer 325, where each output matrix 320 may be subsampled or down-sampled to generate a matrix 330.

Each matrix 330 may be processed by a second convolution layer 335 using a second set of filters. A non-linear activation function (e.g., ReLU) may also be performed by the second convolution layer 335 as described above. An output matrix 340 (e.g., an output feature map) from second convolution layer 335 may have smaller dimensions than matrix 330. Second convolution layer 335 may perform convolutions on matrix 330 using the second set of filters to generate multiple output matrices 340. In the example shown in FIG. 3, second convolution layer 335 may have a depth of six. Each output matrix 340 may be passed to a pooling layer 345, where each output matrix 340 may be subsampled or down-sampled to generate an output matrix 350.

The output matrices 350 from pooling layer 345 may be flattened to vectors by a flatten layer 355. The flattened vectors may be passed through a fully connected layer 360 (e.g., a multi-layer perceptron (MLP)). Fully connected layer 360 may include an input layer 370 that takes the output vectors from flatten layer 355. Fully connected layer 360 may also include a hidden layer 380 and an output layer 390. Fully connected layer 360 may classify the object in the input image into one of several categories using feature maps or output matrix 350 and, for example, a Softmax function. The operation of the fully connected layer may be represented by matrix multiplications. For example, if there are M nodes on input layer 370 and N nodes on hidden layer 380, and the weights of the connections between the M nodes on input layer 370 and the N nodes on hidden layer 380 can be represented by a matrix W that includes M□N elements, the output Y of hidden layer 380 may be determined by Y=X×W.

The convolution operations in a CNN may be used to extract features from the input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to generate a final value that represents a single element in an output matrix (e.g., a feature map). A filter may act to detect certain features from the original input image.

The convolution using one filter (or one filter set) over an input pixel array may be used to produce one feature map, and the convolution using another filter (or another filter set) over the same input pixel array may generate a different feature map. A CNN may learn the weights of the filters on its own during the training process based on some user specified parameters (which may be referred to as hyperparameters), such as the number of filters, the filter size, the architecture of the network, etc. A particular number of filters and/or a particular size of a filter can be determined for generating the feature maps so as to improve image feature extractions as well as pattern recognition in new images.

The sizes of the output feature maps may be determined based on parameters, such as the depth, stride, and zero-padding. As described above, the depth of a convolution layer may correspond to the number of filters (or sets of filters) used for the convolution operation. For example, in CNN 300 shown in FIG. 3, three distinct filters are used in first convolution layer 315 to perform convolution operations on the input image, thus producing three different output matrices 320 (or feature maps). Stride is the number of pixels by which the filter matrix is slid over the input pixel array. For example, when the stride is one, the filter matrix is moved by one pixel at a time. When the stride is two, the filter matrix is moved by two pixels at a time. Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 3, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions, such as tanh or sigmoid function, can also be used, but ReLU has been found to perform better in many situations.

Spatial pooling (also referred to as subsampling or downsampling) may reduce the dimensions of each feature map, while retaining the certain important information. In particular, pooling may make the feature dimensions smaller and more manageable, and reduce the number of parameters and computations in the network. Spatial pooling may be performed in different ways, such as max pooling, average pooling, sum pooling, etc. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood.

In the example shown in FIG. 3, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a convolutional neural network, such as CNN 300, may be similar to the training process for any feedforward neural network. First, all parameters and weights (including the weights in the filters and weights for the fully connected layer) may be initialized with random values or the parameters of a known neural network. Second, the convolutional neural network may take a training sample (e.g., a training image) as input, perform the forward propagation steps (including convolution, non-linear activation, and pooling operations, along with the forward propagation operations in the fully connected layer), and determine the output probability for each possible class. The training sample may be classified using a Softmax function based on the output probabilities. The classification result of the training sample by the convolutional neural network may be compared with the expected result, and the error between the expected result and the classification output may be propagated back to the previous layer. The weights may be adjusted accordingly based on the error. For example, techniques such as the backpropagation techniques may be used to calculate the gradients of the error with respect to the parameters to be trained in the network, and the gradient descent may be used to update the parameters to be trained in the network to minimize the output error. This process may be repeated for a certain number of times, a certain number of training samples, or until the output error is below a predetermined threshold.

At the end of the training process, all parameters of the CNN may have been optimized to correctly classify the training samples from the training dataset. When an unseen sample (e.g., a test sample or a new sample) is input into the CNN, the CNN may go through the forward propagation steps and output a probability for each class using the trained parameters, which may be referred to as an inference (or prediction) process as compared to the training process. If the training dataset is sufficient, the trained network may classify the unseen sample into a correct class.

One example of CNNs is Dense Convolutional Networks (DenseNets). In a DenseNet, each layer may connect to all preceding layers in a feed-forward fashion, where the output feature maps of all preceding layers and the original input feature maps may be concatenated to form the input feature maps for the current layer. DenseNets may use fewer parameters than an equivalent traditional CNN because there is no need to learn redundant feature maps. DenseNets may use less memory and computation to achieve a high performance.

III. Image Classification Using Few-Shot Learning and Transfer Learning

In general, a large number of samples may be needed to train a neural network or other machine-learning model. For digital pathology, no extensively labeled datasets may be available, or it may be expensive and time-consuming to manually analyze and annotate stain images by a medical specialist for training the machine-learning model.

According to certain embodiments, a few-shot learning technique is used to train a machine-learning model (e.g., a neural network) for classifying field of view images of histology slides into various classes that include certain stain patterns, artifacts, and other features of interest. The machine-learning model may include a pre-trained convolutional neural network that includes one or more fully connected layers. The pre-trained convolutional neural network may include a deep neural network that was trained using a large benchmark dataset (e.g., CIFAR-10, CIFAR-100, SVHN, or ImageNet dataset) and was published (available for download), such as a VGG, Inception V3, ResNet (e.g., ResNet-50), DenseNet, and the like. Layers other than the fully connected layers may not be retrained. The one or more fully connected layers of the machine-learning model may be re-trained in multiple iterations (referred to as episodes) using the few-shot learning techniques and a small number of training samples (e.g., stain images) for each image class of multiple (e.g., M) image classes. Knowledge learned from the limited number of training samples of the M image classes may be transferred to classify query samples of other classes, such as stain images with artifacts not in the M image classes used for training the machine-learning model. For example, the trained machine-learning model can be used to classify query images of new image classes by computing relationship scores (e.g., distances of embeddings) between the query images and a few examples of each new image class without retraining the machine-learning model.

Figure 4:
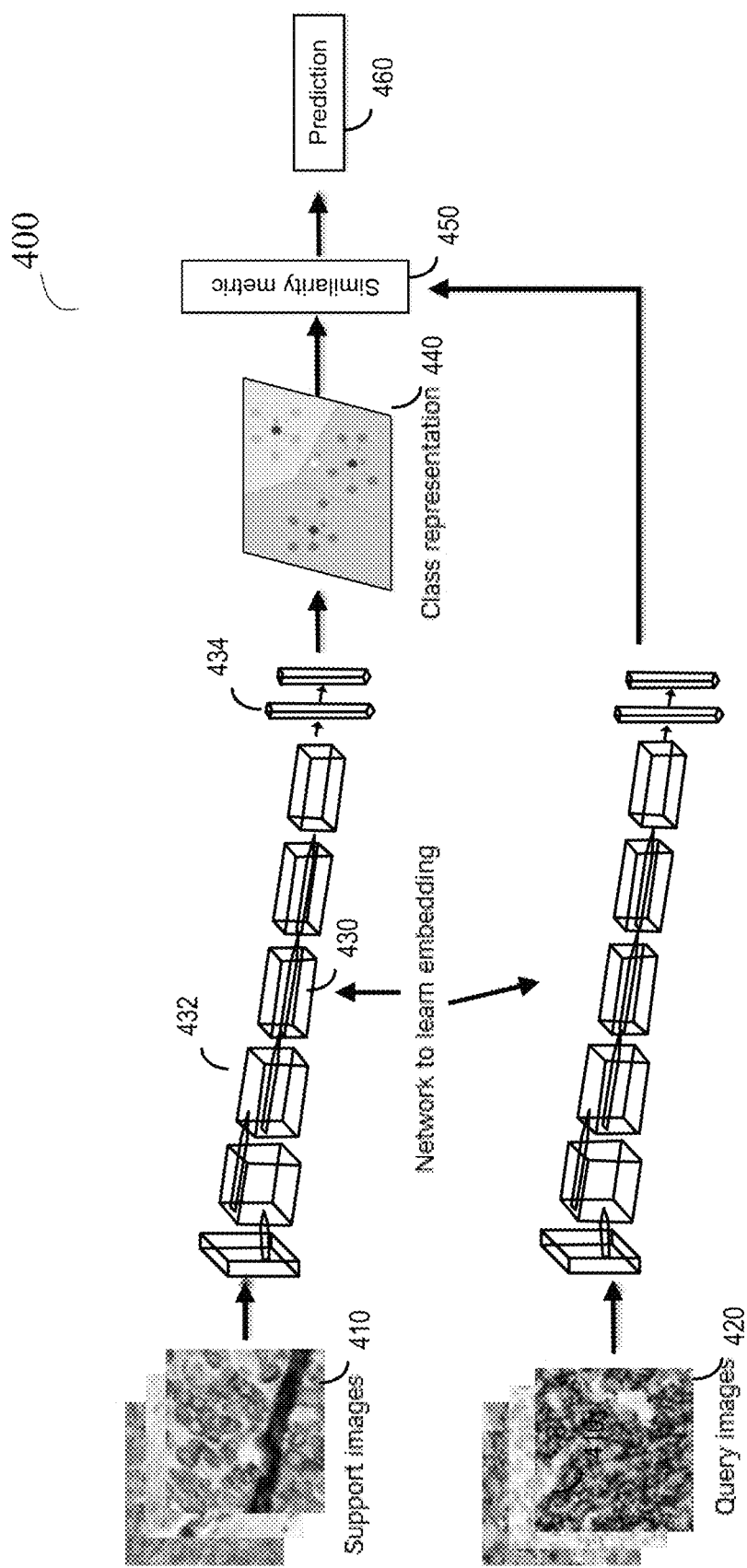
FIG. 4 illustrates an example of a machine-learning model for classifying stain images according to certain embodiments.

FIG. 4 illustrates an example of a machine-learning model 400 for classifying stain images of biological samples according to certain embodiments. In the illustrated example, machine-learning model 400 may include a neural network 430 (e.g., a DenseNet or another deep neural network), which may include multiple convolution layers 432 and one or more fully connected layers 434 at the end of neural network 430. A few (e.g., less than about 20, such as about 5 to 15) support images 410 (e.g., stain images) belonging to each image class of multiple image classes (e.g., stain images without artifacts and stain images with different types of artifacts such as protein markers) may be encoded by neural network 430 into corresponding embeddings (e.g., multi-dimensional feature vectors). The embeddings of the support images belonging to the same image class may form a cluster in a multi-dimensional space 440. The mean, median, or center of the embeddings of the support images belonging to the same image class may be calculated to determine a prototype that represents the image class in multi-dimensional space 440.

Each query image 420 (e.g., a stain image) to be classified may also be encoded by neural network 430 into a corresponding embedding. The distance or similarity metric (e.g., Manhattan, Euclidean, Chebyshev, or Hamming distance, or cosine similarity) between the embedding of query image 420 and the prototype of each image class may be determined by a similarity metric engine 450. The query image 420 may then be classified by a prediction engine 460 based on the similarity metrics between the embedding of query image 420 and the prototype of each class. For example, query image 420 may be classified by prediction engine 460 into a class the prototype of which is the closest to the embedding of query image 420.

Neural network 430, similarity metric engine 450, and prediction engine 460 may be implemented using, for example, one or more generally purpose CPUs, GPUs, TPUs, or systolic arrays, SIMD processors, and the like, and instructions generated by a compiler based on the description of machine-learning model 400.

Machine-learning model 400, more specifically, neural network 430, may be trained using images from a few known image classes. The trained machine-learning model 400 (or neural network 430) may also be used to classify query images of new image classes (e.g., with new types of artifacts). For example, to determine if a query image belongs to a new image class, a few (e.g., less than 20, such as 1, 5, 10, 15, etc.) support images of the new image class may be provided and used as inputs. The support images may be encoded or otherwise processed by neural network 430 to generate the embeddings for the support images. The prototype that represents the new image class may be determined (for example) by calculating the mean, median, or center of the embeddings of the support images. The embedding of the query image may also be extracted by neural network 430. The similarity metrics of the embedding of the query image with respect to the prototypes of the existing image classes and the new image class may be determined by similarity metric engine 450. The similarity metrics may then be used by prediction engine 460 to determine which class the query image belongs to.

Figure 5:
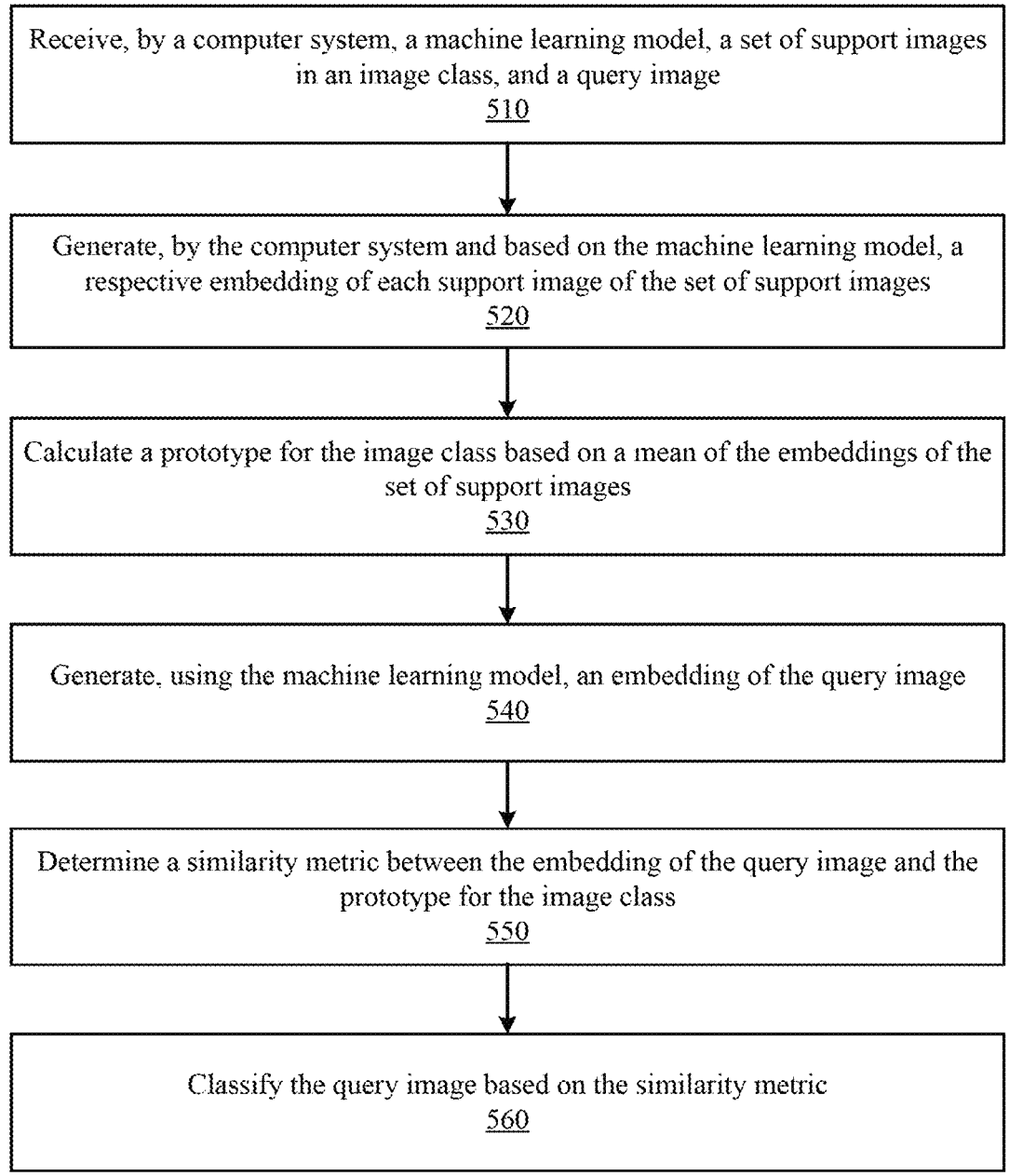
FIG. 5 includes a flowchart illustrating an example of a method of classifying a query image using a machine-learning model and a set of support images according to certain embodiments.

FIG. 5 includes a flowchart 500 illustrating an example of a method of classifying a query image using a machine-learning model and a set of support images according to certain embodiments. Operations described in flowchart 500 may be performed by, for example, a computer system implementing a machine-learning model, such as machine-learning model 400. Although flowchart 500 may describe the operations as a sequential process, in various embodiments, many of the operations may be performed in parallel or concurrently. In addition, the order of the operations may be rearranged. An operation may have additional steps not shown in the figure. Furthermore, embodiments of the method may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium.

In operation 510, a computer system may receive a machine-learning model, a set of support images in a first image class, and a query image. The support images and the query image may be, for example, stain images with or without artifacts. For example, the support images in the first image class may include a common type of artifacts described above, such as water marks, tissue folds, blurs, and the like. The query image may or may not belong to the first image class. One example of the machine-learning model may be machine-learning model 400. The machine-learning model may be trained using training images from a number of image classes, which may or may not include the first image class. The machine-learning model may be trained to generate embeddings of input images, such as stain images. The machine-learning model may include a deep neural network (e.g., neural network 430, such as a DenseNet) that can extract feature vectors or generate embeddings of input images. The machine-learning model may also include a similarity metric engine (e.g., similarity metric engine 450) that can determine similarity metrics (e.g., square Euclidean distance) between the embeddings, and a prediction engine (e.g., prediction engine 450) that classifies an query image based on the similarity metrics associated with the query image.

In operation 520, the computer system may generate, based on the machine-learning model, a respective embedding of each support image of the set of support images. For example, the support image may be passed to a deep convolution neural network, such as a ResNet or DenseNet, which may apply various filters to the support image through convolution, activation, and pooling operations to extract a low-dimensional feature vector as the embedding that represents the support image in a multi-dimensional space.

In operation 530, the computer system may calculate a prototype for the first image class. The embeddings of the set of support images may form a cluster in the multi-dimensional space. The prototype may be, for example, a mean, median, or center of the embeddings of the set of support images, such as a center of the cluster of the embeddings of the set of support images in the multi-dimensional space. The prototypes of image classes that are used during the training of the machine-learning model may be known or may be determined using support images from these image classes.

In operation 540, the computer system may generate an embedding of the query image based on the same machine-learning model used to generate the embeddings of the support images. Thus, the query image may be mapped to the same multi-dimensional space as the support images.

In operation 550, the computer system may determine a similarity metric between the embedding of the query image and the prototype for the first image class. As described above, the similarity metric may include, for example, the squared Euclidean distance or the cosine similarity between two vectors in the multi-dimensional space. In some embodiments, the similarity metric between the embedding of the query image and the known prototype of each other image class may be determined as well.

In operation 560, the computer system may classify the query image based on the similarity metric between the embedding of the query image and the prototype for the first image class, and/or the similarity metrics between the embedding of the query image and the known prototype of each other image classes. For example, the computer system may determine that the query image is not in the first image class based on determining that the squared Euclidean distance between the embedding of the query image and the prototype of the first image class is greater than a threshold value. In another example, the computer system may determine that the query image may be in a second image class based on determining that the squared Euclidean distance between the embedding of the query image and the prototype of the second image class is the lowest among the prototypes of the image classes.

The machine-learning model described above may be trained using few-shot learning and transfer learning techniques. The machine-learning model may be based on a pre-trained convolutional neural network. The pre-trained convolutional neural network may include a deep neural network that was trained using a large benchmark dataset (e.g., CIFAR-10, CIFAR-100, SVHN, or ImageNet dataset) and was published (available for download), such as a VGG, Inception, ResNet, DenseNet, and the like. Only a few layers, such as one or more fully connected layers, of the pre-trained convolutional neural network may be retrained to classify stain images. The one or more fully connected layers may be retrained using a small number of training images using the few-shot learning technique.

Figure 6:
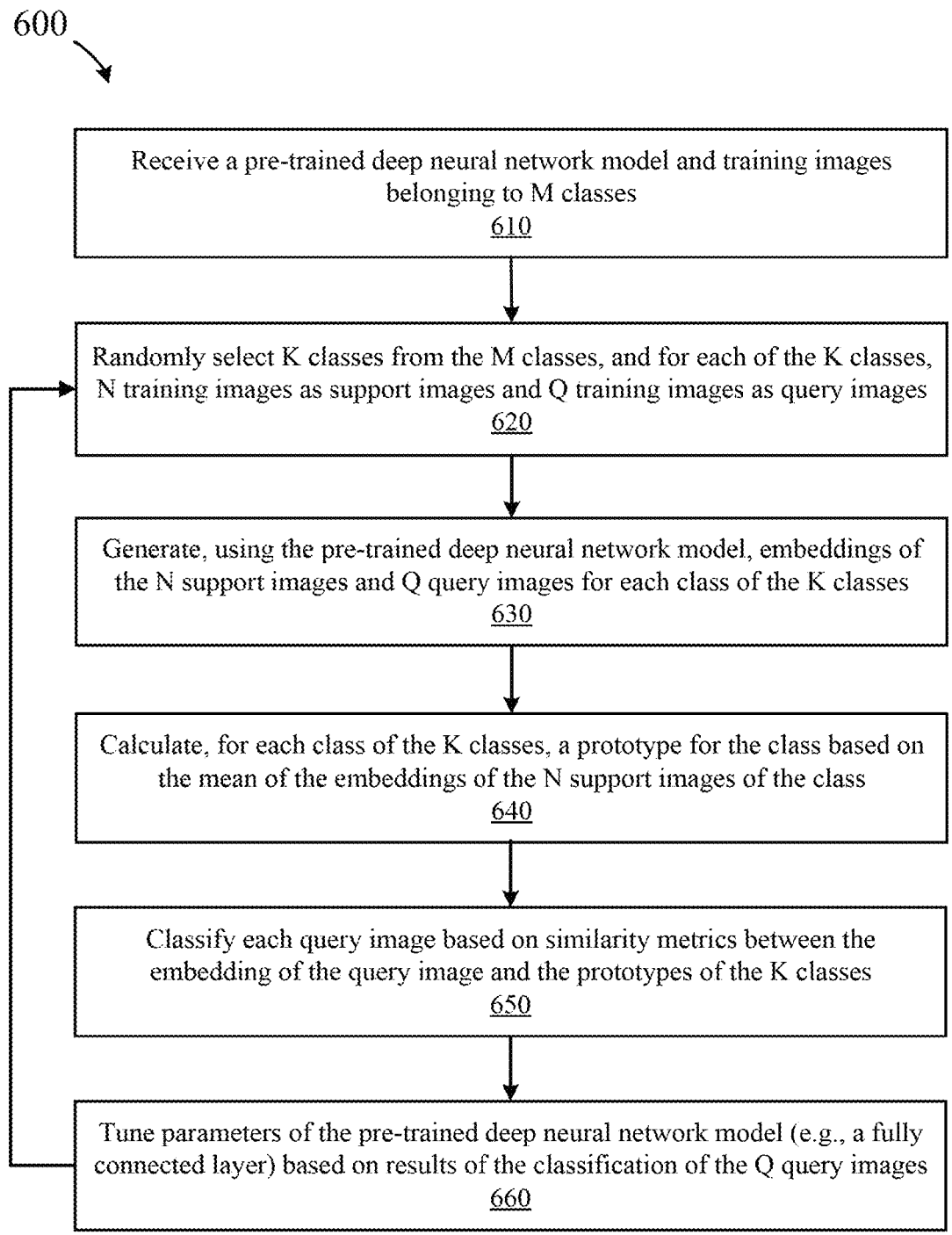
FIG. 6 includes a flowchart illustrating an example of a method of training a machine-learning model for classifying stain images or other images according to certain embodiments.

FIG. 6 includes a flowchart 600 illustrating an example of a method of training a machine-learning model for classifying stain images or other images according to certain embodiments. Operations described in flowchart 600 may be performed by, for example, a computer system that includes one or more CPUs, GPUs, TPUs, systolic arrays, or SIMD processors. Although flowchart 600 may describe the operations as a sequential process, in various embodiments, many of the operations may be performed in parallel or concurrently. In addition, the order of the operations may be rearranged. An operation may have additional steps not shown in the figure. Furthermore, embodiments of the method may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium.

At operation 610, a computer system may receive a pre-trained deep neural network model and training images belonging to M classes. The pre-trained convolutional deep neural network model may include a deep neural network that was trained using a large benchmark dataset (e.g., CIFAR-10, CIFAR-100, SVHN, or ImageNet dataset) and was published (available for download), such as a VGG, Inception, ResNet, DenseNet, and the like. In one example, the pre-trained deep neural network model may include a DenseNet-121 that includes multiple convolution layers, where the inputs to each convolution layer may include the original input feature maps and the output feature maps of all preceding layers. Because each convolution layer has access to feature maps in different levels from the preceding convolutional layers, DenseNet-121 may have a better performance than a conventional convolution neural network. As many other neural networks, DenseNet-121 may also include one or more fully connected layers, for example, at the end. DenseNet-121 may also include a Softmax layer. The training images may include, for example, stain images having different types of patterns and artifacts as described above. The training images may be labeled with the corresponding image classes (e.g., types of patterns or artifacts). The training images may include a respective set of training images for each image class.

At operation 620, the computer system may randomly, pseudorandomly, or otherwise select K classes from the M classes, where K≤M. From the respective set of training images in each class of the selected K classes, N training images may be randomly, pseudorandomly, or otherwise selected as support images and Q training images may be randomly, pseudorandomly, or otherwise selected as query images. N may be a small number, such as less than 20, for example, about 5 to 10. Q is also a small number, such as about 5 to 10. In one example, the set of training images for each class may include 20 training images, K may be 5, N may be 10, and Q may be 5. Thus, 50 support images and 25 query images may be selected from 100 training images belonging to 5 classes.

At operation 630, the computer system may use the pre-trained deep neural network model to generate embeddings of the N support images and Q query images for each class of the K classes. Each support image or query image may be passed into the pre-trained deep neural network model to generate a respective feature vector (i.e., embedding). In one example, each training image may include 256☐256 pixels. Each training image may be represented by a 2-dimensional matrix (e.g., 256☐256) or 3-dimensional matrix (e.g., 256☐256☐3 color channels). The feature vector (or embedding) of each training image may include a 1024-element vector. The embeddings of the support images may form clusters in a multi-dimensional space.

At operation 640, the computer system may calculate, for each class of the K classes, a prototype that represents the class in the multi-dimensional space. For example, the prototype of a class may be the mean or the median of the embeddings of the N support images of the class, or the center of the cluster of the embeddings of the N support images of the class.

At operation 650, similarity metrics between the embedding of each respective query image of the Q query images and the prototypes of the K classes may be determined. In one example, each similarity metric of the similarity metrics for a query image may be a squared Euclidean distance between the embedding of the query image and the prototype of a respective class. Each query image of the Q query images may then be classified based on the similarity metrics between the embedding of the query image and the prototypes of the K classes. For example, a query image may be classified into a class the prototype of which is the closest (e.g., having the shortest Euclidean distance) to the embedding of the query language.

At operation 660, based on the results of the classification of the Q query images, the parameters of the pre-trained deep neural network model, such as the parameters (e.g., weights) of a fully connected layer, may be tuned. As described above, the parameters of the pre-trained deep neural network model may be tuned using the back-propagation techniques, where the gradients of the classification errors with respect to parameters may be calculated and used to update the parameters. In some embodiments, the classical stochastic gradient descent procedure may be used to update the parameters of the pre-trained deep neural network model. In some embodiments, the adaptive moment (Adam) estimation technique may be used to update the parameters of the pre-trained deep neural network model. The Adam estimation technique is an adaptive learning rate optimization technique for training deep neural networks. The Adam estimation technique leverages the power of adaptive learning rate methods to find individual learning rates for each parameter. The Adam estimation technique may adapt the parameter learning rates based on the average first moment (the mean) and the average of the second moments of the gradients (the uncentered variance).

Operations 620-660 may be performed iteratively to optimize the parameters of the deep neural network model. In some embodiments, operations 620-660 may be performed for a predetermined number of times. In some embodiments, operations 620-660 may be performed until every training image in the received training images for the M classes has been selected. In some embodiments, operations 620-660 may be performed until the classification error is below a certain threshold value.

According to certain embodiments, based on the classification results, the stain images classified into different artifact classes may be excluded, marked, or retaken to improve the quality of the stain images for subsequent analysis. For example, stain images with certain artifacts may be excluded from subsequent analysis. In some stain images with certain artifacts, the portions of the stain images with artifacts may be identified or marked so that the portions can be excluded from subsequent analysis. For some stain images with certain artifacts, stain images of the stained sections may be taken from different fields of view.

IV. Example Artifact Classification of IHC Stained Tissues

In one example, images of IHC stained tissues of different biomarkers, such as BCL2, HER2, CD10, Ki67, and the like, are scanned at 40☐ magnification. The scanned images may include a variety of stain features and artifacts. A training dataset may be curated by extracting patches of 256☐256 pixels from the slide tissue images and manually annotating the patches by pathologists. The curated training dataset may include stain images belonging to 6 image classes. The 6 image classes may include 2 stain classes (nuclear stains and membrane cytoplasmic stains), 3 artifact classes (tissue folds, water marks on the tissue, and non-specific stromal staining), and one non-staining class. The training dataset may include 20 samples (images or image patches) for each of the 6 classes, for a total of 120 samples. The training dataset may be divided into a support set and a query set. For example, to perform few-shot learning, 10 samples from each class may be randomly, pseudorandomly, or otherwise selected to serve as a support set and the remaining 10 samples from each class may be used as the query set. In addition, 20 samples for each of 3 classes of novel artifacts, including surgical dissection ink, cut (i.e., torn tissue), and blurred areas, may be curated and used to evaluate the accuracy of the trained machine-learning model.

A prototypical network with a DenseNet-121 network may be used as the machine-learning model. The DenseNet-121 network may be a pre-trained and/or published model (e.g., trained using CIFAR-10, CIFAR-100, SVHN, or ImageNet dataset), and only the fully connected layer of the DenseNet-121 network may be re-trained using the training dataset. The final fully connected layer may include 1024 nodes, and may be used to generate low dimensional representations of input images. This may help to overcome the overfitting issue resulted from the use of a small number of samples. Batch normalization is used to regularize the network. A single network is used to generate the embeddings for both the support images and the query images. As described above, representations (e.g., prototypes) of the 6 image classes are determined based on the support images, and are evaluated against the embeddings of the query images using similarity metrics (e.g., Euclidean distances) to classify the query images.

In the training phase, the machine-learning model may be trained in multiple iterations based on few-shot learning. Each training iteration may be referred to as an episode. In each episode, selected support images and query images are sent to the network, the network loss (e.g., classification error) is determined, and the error gradients are back-propagated to the fully connected layer. In each episode, K image classes may be randomly, pseudorandomly, or otherwise selected from M image classes, where K≤M. For each image class of the K image classes, N support images of the image class may be randomly, pseudorandomly, or otherwise selected, where N is a hyper-parameter (the number of shots) and may be selected based on the number of available samples. For example, N may be about 5 to 10. For each image class of the K image classes, Q query images may also be randomly, pseudorandomly, or otherwise selected. Embeddings (e.g., d-dimensional feature vectors, where d=1024 in one example) of the support images may be generated by passing the support images through the machine-learning model. Thus, for each image class, N embeddings may be generated. The mean, median, or center of the N embeddings for the N support images in each class may be calculated to determine a prototype representing the image class. To classify the Q query images, each query image in the Q query images may be encoded into a query embedding. A squared Euclidean distance metric may be calculated to determine the distance from each prototype to each query embedding. Each query image may be classified into the class prototype of which is the closest to the query embedding. The classification errors may be back-propagated to optimize the parameters of the machine-learning model using the negative log-likelihood loss and an Adam optimizer with a fixed learning rate of 0.001. The machine-learning model is trained for 10 iterations.

Figure 7:
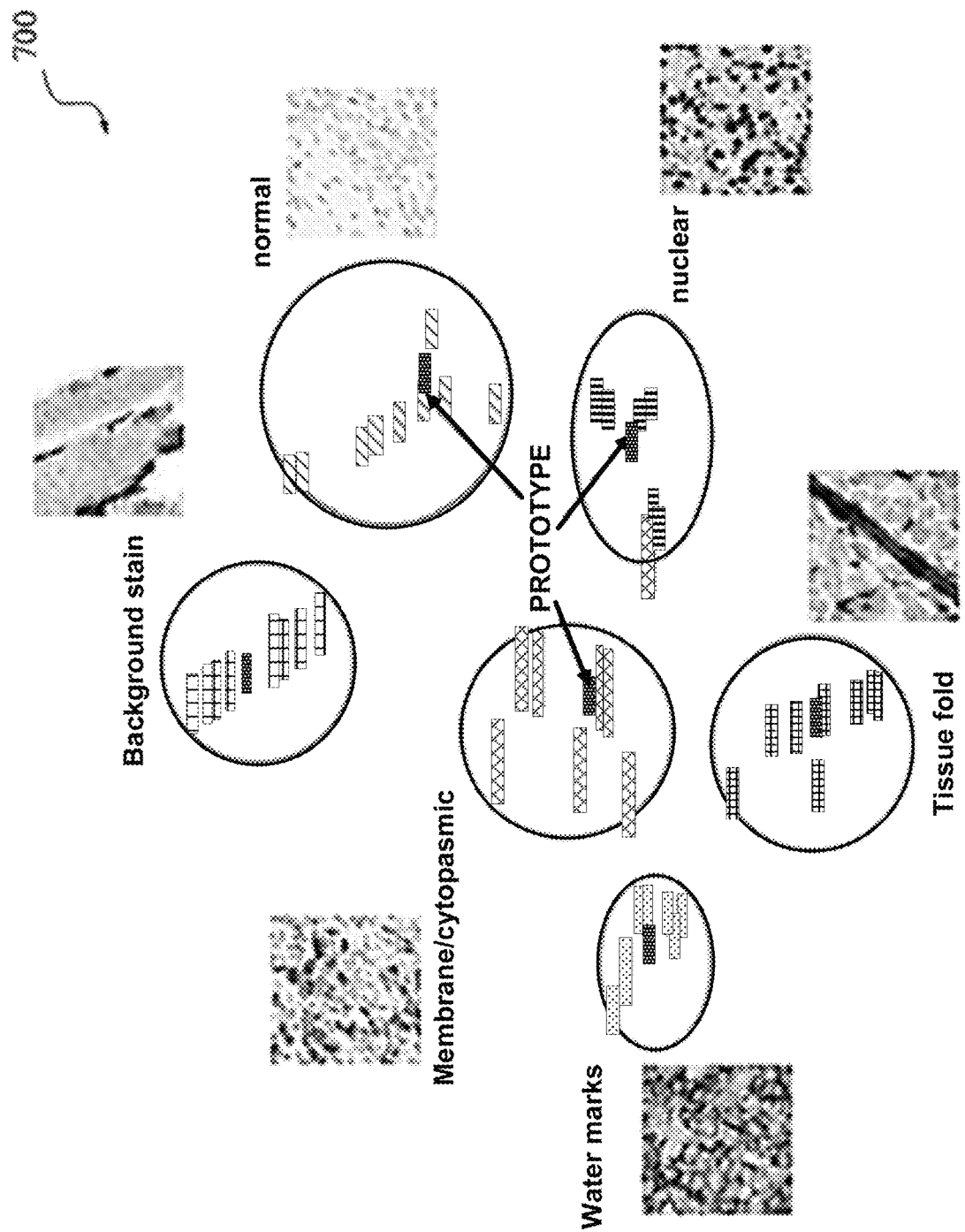
FIG. 7 illustrates an example of a t-sne visualization of outputs of a machine-learning model according to certain embodiments.

FIG. 7 includes a diagram 700 illustrating an example of a t-sne visualization of outputs of the machine-learning model trained after 10 iterations according to certain embodiments. Diagram 700 shows the class representations (e.g., prototypes) of the 6 image classes described above, including 2 stain classes (nuclear stains and membrane cytoplasmic stains), 3 artifact classes (tissue folds, water marks on the tissue, and non-specific stromal staining), and one non-staining class. Diagram 700 also shows the embeddings of the query images. The prototype of each image class is created using 10 support images. Five query images in each image class are used for the visualization. FIG. 7 shows that the trained machine-learning model can efficiently cluster the embeddings of the query images around corresponding prototypes.

In the inference phase, the trained machine-learning model may classify stain images into the image classes used in the training phase and new image classes that are not used in the training phase. The new image classes may correspond to, for example, new types of artifacts. The machine-learning model does not need to be re-trained using images from the new image classes. To predict whether a query image belongs to a new image class, the trained machine-learning model may use a few support images of the new image class to generate a cluster of embeddings of the support images, determine a prototype that represents the new image class based on the embeddings of the support images, encode the query image into a query embedding, and classify the query image based on a similarity metric between the query embedding and the prototype of the new image class as described above.

Figure 8:
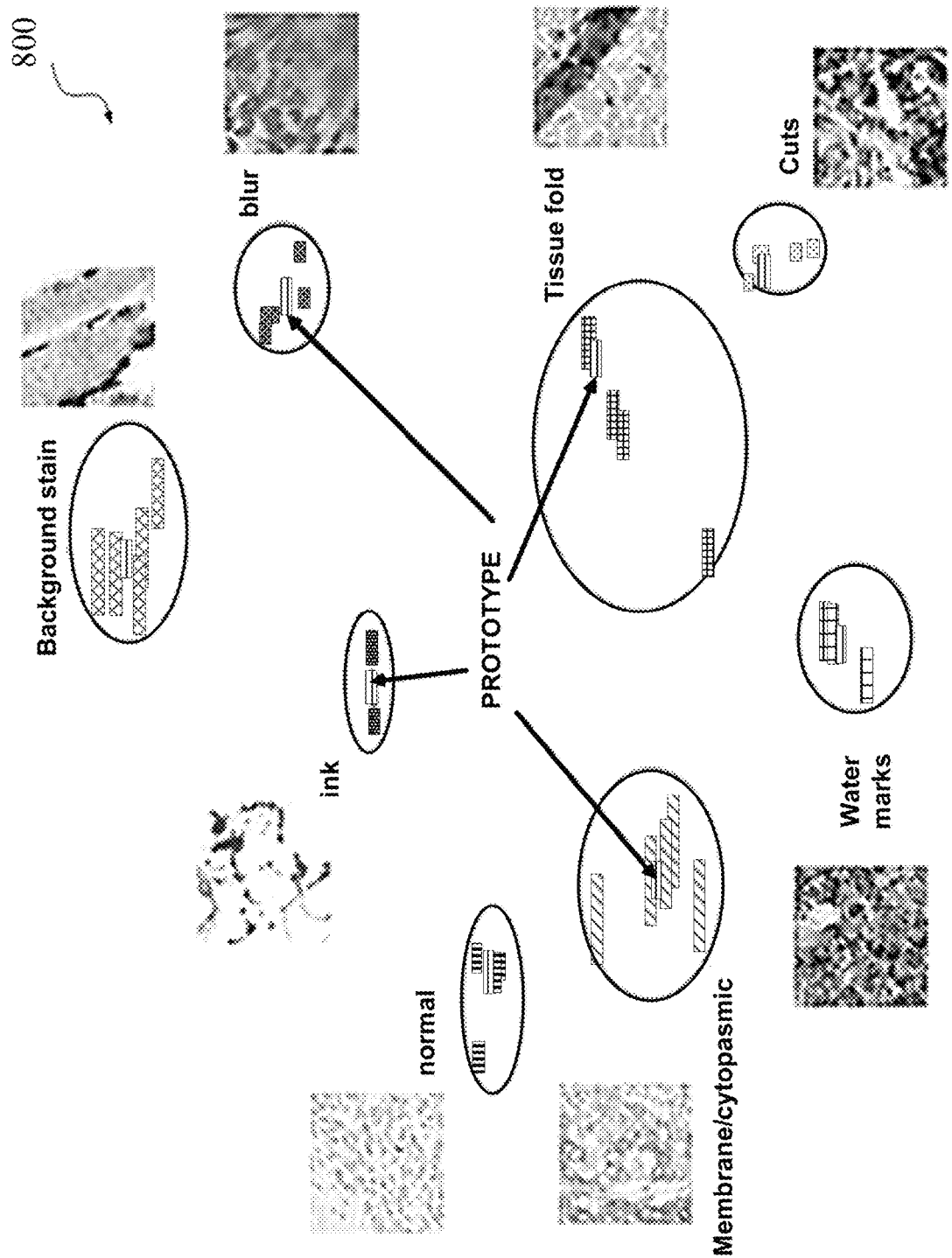
FIG. 8 illustrates an example of a t-sne visualization of outputs of a machine-learning model according to certain embodiments.

FIG. 8 includes a diagram 800 illustrating an example of a t-sne visualization of outputs of a trained machine-learning model for input images of different classes according to certain embodiments. In the example shown in FIG. 8, the machine-learning model is the same as the machine-learning model described with respect to FIG. 7. The machine-learning model is trained using images from 6 image classes described above, including 2 stain classes (nuclear stains and membrane cytoplasmic stains), 3 artifact classes (tissue folds, water marks on the tissue, and non-specific stromal staining), and one non-staining class. The prototypes of these six image classes and the embeddings of query images in these six image classes are shown in FIG. 8.

FIG. 8 also shows the outputs of the machine-learning model for stain images from three new image classes that are not used during the training phase of the machine-learning model. The three new image classes include artifacts of surgical dissection ink, cut (i.e., torn tissue), and blurred areas. FIG. 8 shows the prototypes for the three new image classes determined using support images associated with the three new image classes. FIG. 8 also shows the embeddings of query images for the three new image classes. FIG. 8 indicates that, for the three new image classes that are not used to train the machine-learning model, the machine-learning model can also efficiently cluster the embeddings of the query images around the corresponding prototypes.

For comparison purposes, a machine-learning model based on the pre-trained DenseNet-121 model is re-trained using transfer learning but not the few-shot learning. The machine-learning model is re-trained using an iterative training process for 10 iterations with a learning rate of 0.001. The classification accuracies of the machine-learning model trained using transfer learning and different numbers of training samples, and the classification accuracy of the machine-learning model trained using both few-shot learning and transfer learning are shown in Table 1. The accuracies of the trained machine-learning models are evaluated using a separate set of 60 test samples (including 10 images per class). As shown in Table 1, the machine-learning model trained using transfer learning based on 60 support images can achieve an accuracy of about 80%. The machine-learning model trained using transfer learning based on 120 training samples that include both support images and query images can achieve an accuracy of about 86%. The machine-learning model trained using both transfer learning and few-shot learning based on 120 training samples can achieve an accuracy of about 96% (an improvement of about 10% over the machine-learning model trained using transfer learning only).

TABLE 1

Comparison of training techniques

| Method | Accuracy |
|---|---|
| Transfer learning (60 samples) | 80% |
| Transfer learning (120 samples) | 86% |
| Few-shot training (120 samples) | 96% |

Figure 9:
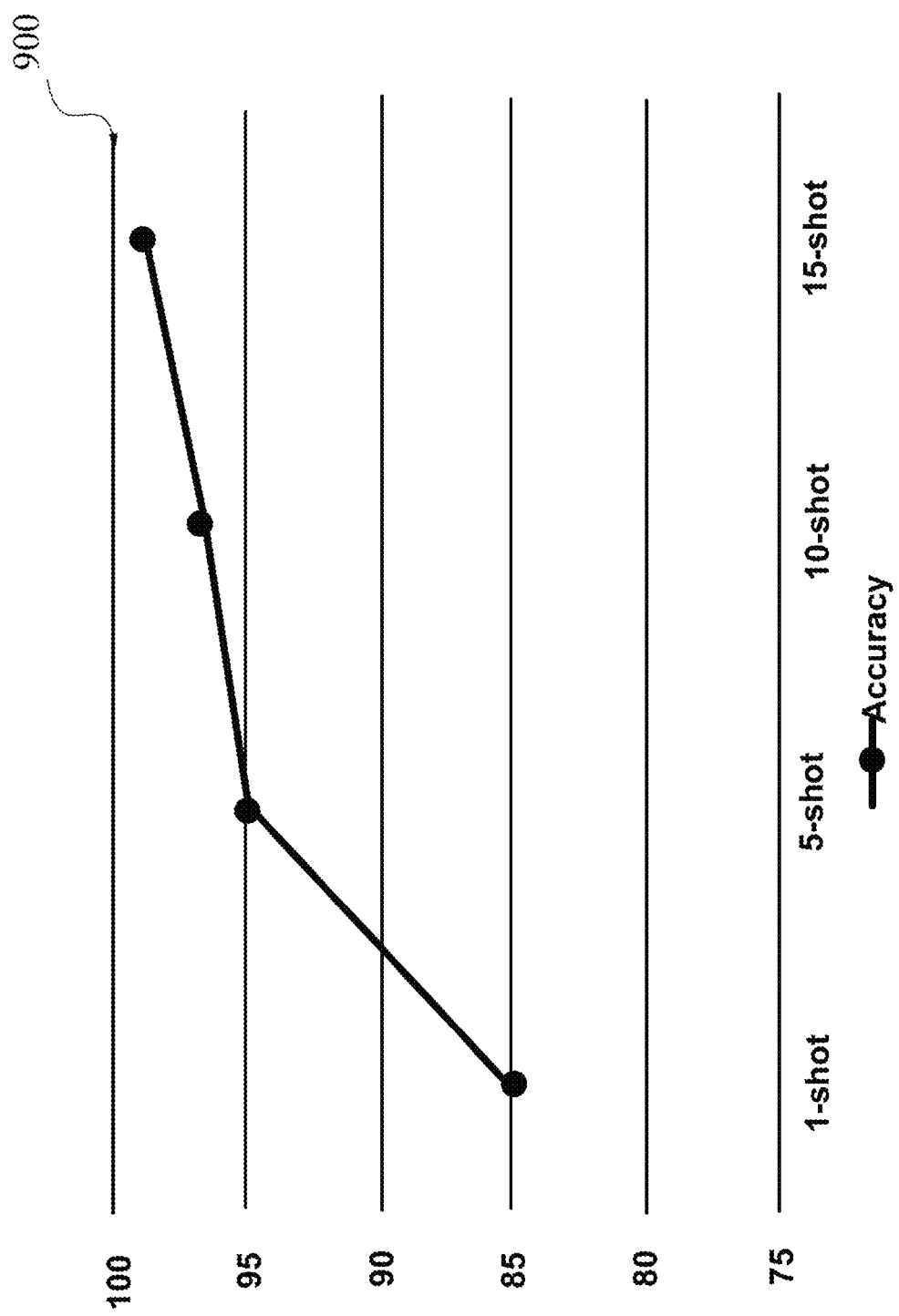
FIG. 9 includes a graph showing the accuracies of machine-learning models trained using few-shot learning and different numbers of support images according to certain embodiments.

FIG. 9 includes a graph 900 showing the accuracies of machine-learning models trained using few-shot learning and different numbers of support images (numbers of shots) according to certain embodiments. FIG. 9 shows that increasing the number of support examples (the number of shots) can lead to a better classification accuracy. However, the accuracy curve starts to flatten when the number of shots is greater than about 5. When the number of shots is greater than about 15, the improvement is diminishing and the accuracy may saturate at an upper limit.

V. Example Artifact Classification of H&E Stained Tissues (A) Process Overview

Figure 10:
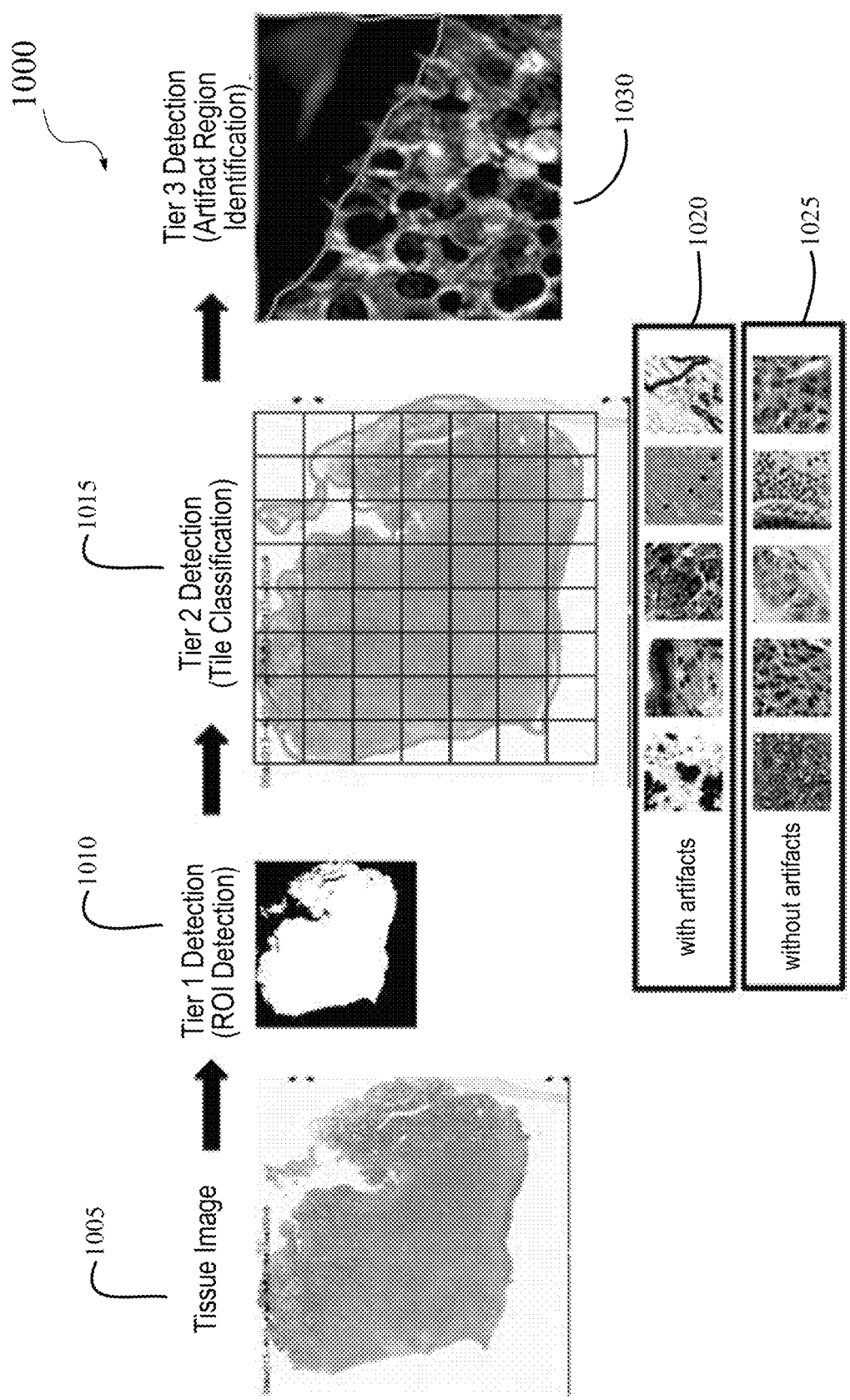
FIG. 10 illustrates an example of a schematic diagram for classifying images depicting H&E stained tissue sections according to certain embodiments.

FIG. 10 illustrates an example of a schematic diagram 1000 for classifying images depicting H&E stained tissue sections according to certain embodiments. At block 1005, a computer system receives a scanned image of H&E stained tissue. In some embodiments, the scanned image includes one or more stain patterns, artifacts, and/or other features of interest. At block 1010, the computer system identifies a region of interest in the scanned image. In some instances, a mask is generated to isolate the region of interest in the scanned image. The mask can include pixel information that represent boundaries of the region of interest, such that the mask can be used delete information in the scanned image that is peripheral to the region of interest.

Various techniques for identifying the region of interest can be used. For example, pixels of the scanned image at an initial color space (e.g., an RGB color space) can be processed to identify pixel intensity information of the scanned image under a hue, saturation, and value (HSV) color space. Then, a series of image-processing operations (e.g., masking, filtering, smoothening) can be applied to the pixel intensity information to extract a region of interest. In another example, an Okapi-Chamfer matching algorithm can be applied to the scanned image to identify a region of interest. In this example, the region of interest can be identified based on distance information calculated between feature vectors representing the scanned image and feature vectors of training images that are clustered based on their feature similarity.

At block 1015, the computer system divides the region of interest into a plurality of image tiles. Each image tile of the plurality of image tiles may then be processed to predict whether the image tile includes an artifact. In some embodiments, the computer system applies a trained machine-learning model to the plurality of image tiles. The machine-learning model may have been trained in multiple iterations using few-shot learning. With respect to the example classification for H&E stained tissues, the few-shot learning was used with two training iterations to identify 5 image classes, including 4 artifact classes and 1 tissue class. In the first training iteration, the machine-learning model was trained with training images corresponding to the tissue-fold class and the pen-mark class. The two image classes are more commonly encountered and distinctive relative to other image classes. In the second training iteration, the machine-learning model was trained with training images corresponding to the hemorrhage class and the microtome-chatter class.

After the training phase is complete, the computer system may apply the trained machine learning model to each image tile of the plurality of image tiles for classification. For example, a first set of image tiles 1020 are classified as including at least one artifact (e.g., a hemorrhaging region, a pen-mark), and a second set of image tiles 1025 are classified as having no artifacts. Additionally or alternatively, the computer system applies the trained machine-learning model to predict a particular type of the artifact or tissue depicted in each image tile. With respect to the example classification for H&E stained tissues, representations (e.g., prototypes) of 5 image classes were determined based on the support images, in which each image class indicated a presence of a particular type of an artifact. The 5 image classes included a hemorrhage class, a microtome-chatter class, a pen-mark class, a tissue-fold class, and a tissue class. The representations of 5 image classes were evaluated against the embeddings of each image tile using similarity metrics (e.g., Euclidean distances) to classify the image tile as having a particular type of an artifact.

In some embodiments, a prototypical network with a DenseNet-121 network is used as the machine-learning model. The DenseNet-121 network may be a pre-trained and/or published model (e.g., trained using CIFAR-10, CIFAR-100, SVHN, or ImageNet dataset), and one or more layers (e.g., the fully connected layer of the DenseNet-121 network) may be re-trained using the training dataset. A single network can be used to generate the embeddings for both the support images and the query images (e.g., the plurality of image tiles).

At block 1030, the computer system identifies, for each image tile predicted as including one or more artifacts, locations of the one or more artifacts in the image tile. In some instances, the locations of the one or more artifacts include x- and -y coordinate values of each pixel of the image tile that corresponds to the one or more artifacts.

(B) Example Regions of Interest

Figure 11:
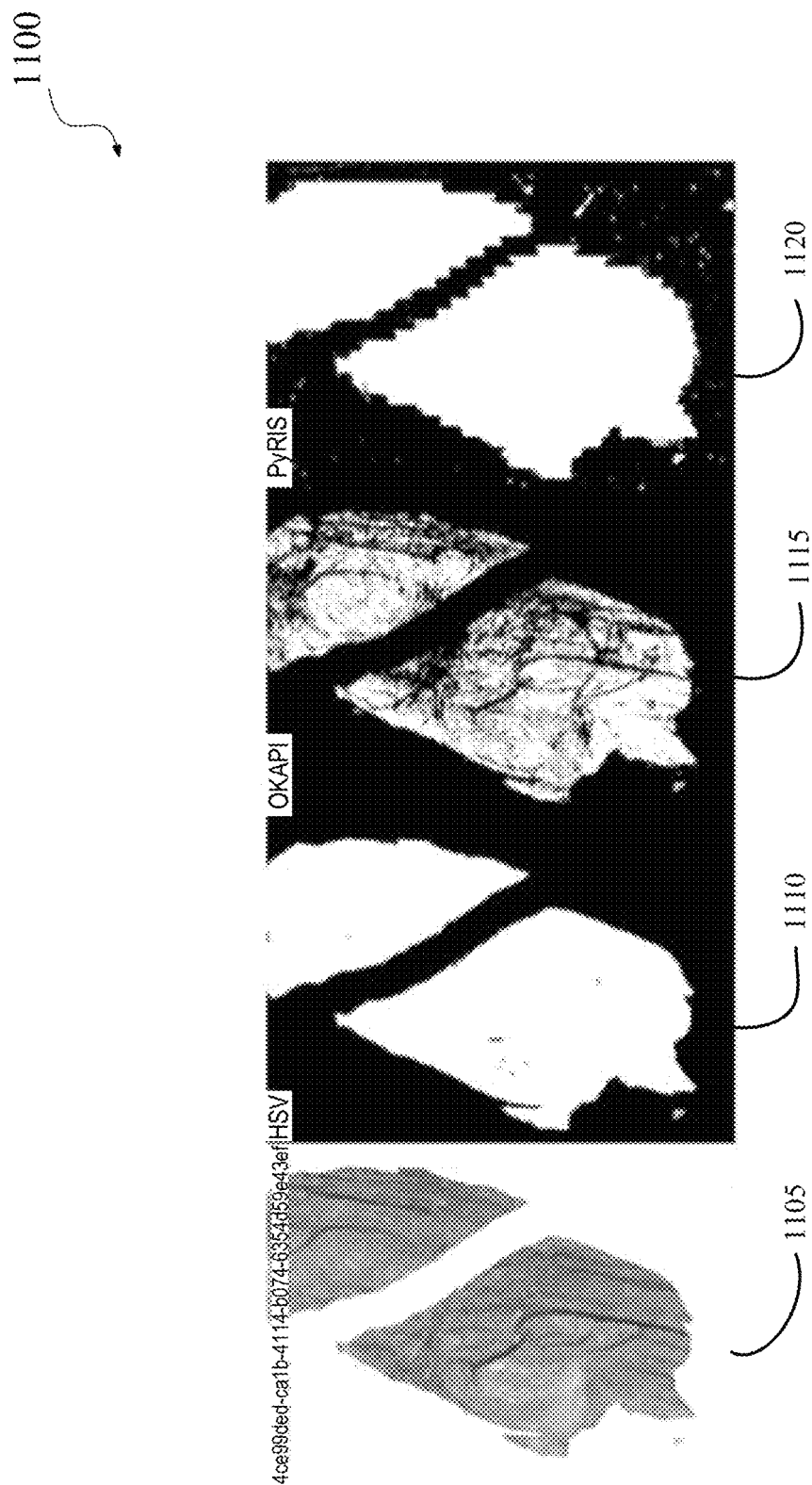
FIG. 11 shows examples of regions of interest generated by processing an H&E-stained image according to certain embodiments.

FIG. 11 shows examples of regions of interest 1110, 1115, and 1120 generated by processing an H&E-stained image 1105 according to certain embodiments. In some embodiments, each of the regions of interest 1110, 1115, and 1120 is generated by performing various image-processing techniques, such as an HSV conversion and an Okapi-Chamfer matching algorithm. For example, the region of interest 1105 can correspond to an output image that is generated based on processing the scanned image through the HSV conversion. In another example, the region of interest 1110 can correspond to an output image that is generated based on processing the scanned image through the Okapi-Chamfer matching algorithm. In yet another example, the region of interest 1120 can correspond to an output image that is generated based on processing the scanned image through a Pyris image-processing system. As shown in FIG. 11, a shape, size, and pixel intensity of the region of interest may differ based on a type of image-processing technique used to process the scanned image.

(C) Performance Evaluation of Trained Machine-Learning Models

The accuracy of the trained machine-learning models can be evaluated using a set of test samples. In an example testing scenario, the machine-learning models were trained with 100 training samples for each of the 5 image classes indicated above (i.e., the hemorrhage class, the microtome-chatter class, the pen-mark class, the tissue-fold class, and the tissue class). The trained machine-learning models were evaluated using test samples of approximately 30 slide images for each image class. As shown in Table 2, the trained machine-learning models achieved an average accuracy of 96.67% for predicting a particular type of an artifact. In addition, the trained machine-learning models achieved an even higher accuracy (98%) for predicting whether an image (e.g., an image tile of the H&E stained image) corresponds to a tissue or an artifact.

TABLE 2

Performance results based on 30 test samples

| Class Label | Class Name | # training FOV | # test FOV | Average Accuracy |
|---|---|---|---|---|
| 1 | hemorrhage | 100 | 30 | 96.67% (98% for tissue vs. non-tissue classification) |
| 2 | microtome_chatter | 100 | 30 | |
| 3 | pen_mark | 100 | 29 | |
| 4 | tissue_fold | 100 | 30 | |
| 5 | tissue | 100 | 31 | |

FIG. 12A shows an example of a confusion matrix 1200A that identifies performance results of a trained machine-learning model for classifying stain images according to certain embodiments. The confusion matrix 1200A was generated based on the set of training and test samples identified in Table 2, in which numbers 1-5 correspond to the hemorrhage class, the microtome-chatter class, the pen-mark class, the tissue-fold class, and the tissue class, respectively. Each column of the confusion matrix 1200A represents the instances in a predicted image class while each row represents the instances in an actual image class. As shown in FIG. 12A, the trained machine-learning models achieved very high accuracy when determining whether a given image corresponds to a hemorrhaging region, a microtome-chatter region, or a tissue-fold region. The accuracy of the trained machine-learning models slightly decreased when classifying images having pen marks. The error rates, however, were still relatively low (e.g., 2 of 29 test samples corresponding to pen marks were misclassified).

In another example testing scenario, the machine-learning models were trained with 100 training samples and 20 validation samples for each of the 5 image classes. The trained machine-learning models were evaluated using 15 supporting samples and 70 test samples for each image class. As shown in Table 3, the trained machine-learning models achieved an average accuracy of 85.14% for predicting a particular type of an artifact. In addition, the trained machine-learning models achieved a relatively higher accuracy (91.71%) for predicting whether an image (e.g., an image tile of the H&E stained image) corresponds to a tissue or an artifact.

TABLE 3

Performance results based on 70 test samples

| Class Label | Class Name | # training FOV | # test FOV | Average Accuracy |
|---|---|---|---|---|
| 1 | hemorrhage | 100 | 70 | 85.14% (91.71% for tissue vs. non-tissue classification) |
| 2 | microtome_chatter | 100 | 70 | |
| 3 | pen_mark | 100 | 70 | |
| 4 | tissue_fold | 100 | 70 | |
| 5 | tissue | 100 | 70 | |

FIG. 12B shows an example of a confusion matrix 1200B that identifies performance results of a trained machine-learning model for classifying stain images according to certain embodiments. The confusion matrix 1200B was generated based on the set of training and test samples identified in Table 3, in which numbers 1-5 correspond to the hemorrhage class, the microtome-chatter class, the pen-mark class, the tissue-fold class, and the tissue class, respectively. Each column of the confusion matrix 1200B represents the instances in a predicted image class while each row represents the instances in an actual image class. As shown in FIG. 12B, the trained machine-learning models achieved relatively high accuracy across 5 image classes. However, the accuracy for classifying images corresponding to tissue-fold regions decreases to approximately 74.3%.

(D) Example Output of Artifact Classification

Figure 13:
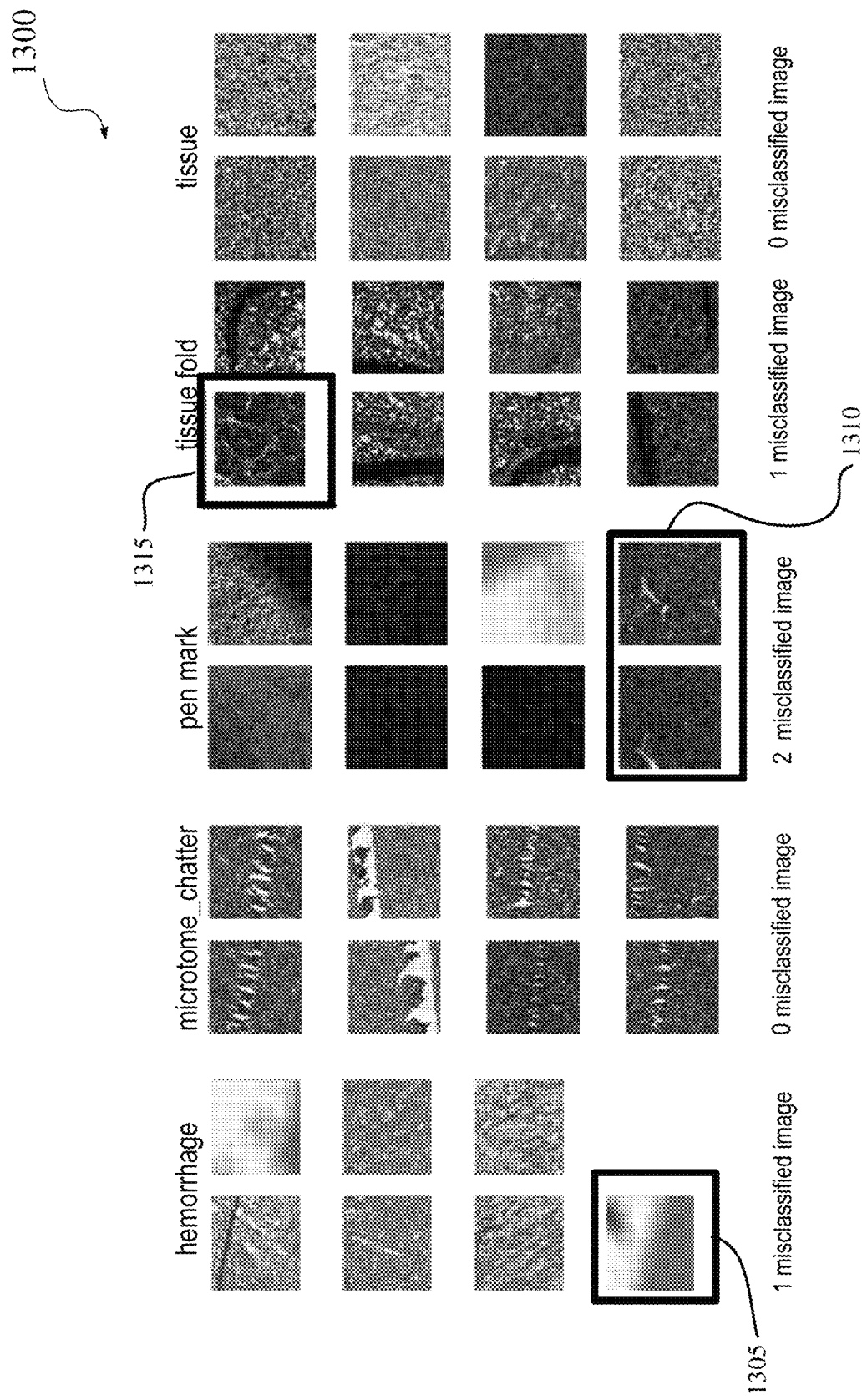
FIG. 13 shows an example set of image results that were classified using trained machine-learning models, in accordance with some embodiments.

FIG. 13 shows an example set of image results 1300 that were classified using trained machine-learning models, in accordance with some embodiments. The trained machine-learning model correctly classified 35 out of 39 tissue images, achieving an accuracy rate of 89.74%. Among the four misclassifications, an image 1305 depicting a pen-mark region was misclassified as having a hemorrhaging region. Two images 1310 depicting tissue sections were misclassified as pen-mark regions. An image 1315 depicting pen-mark region was misclassified as a tissue-fold region. As indicated above, the trained machine-learning models misclassify images with pen-mark regions more often than images with other types of artifacts.

VI. Computing Environment

Figure 14:
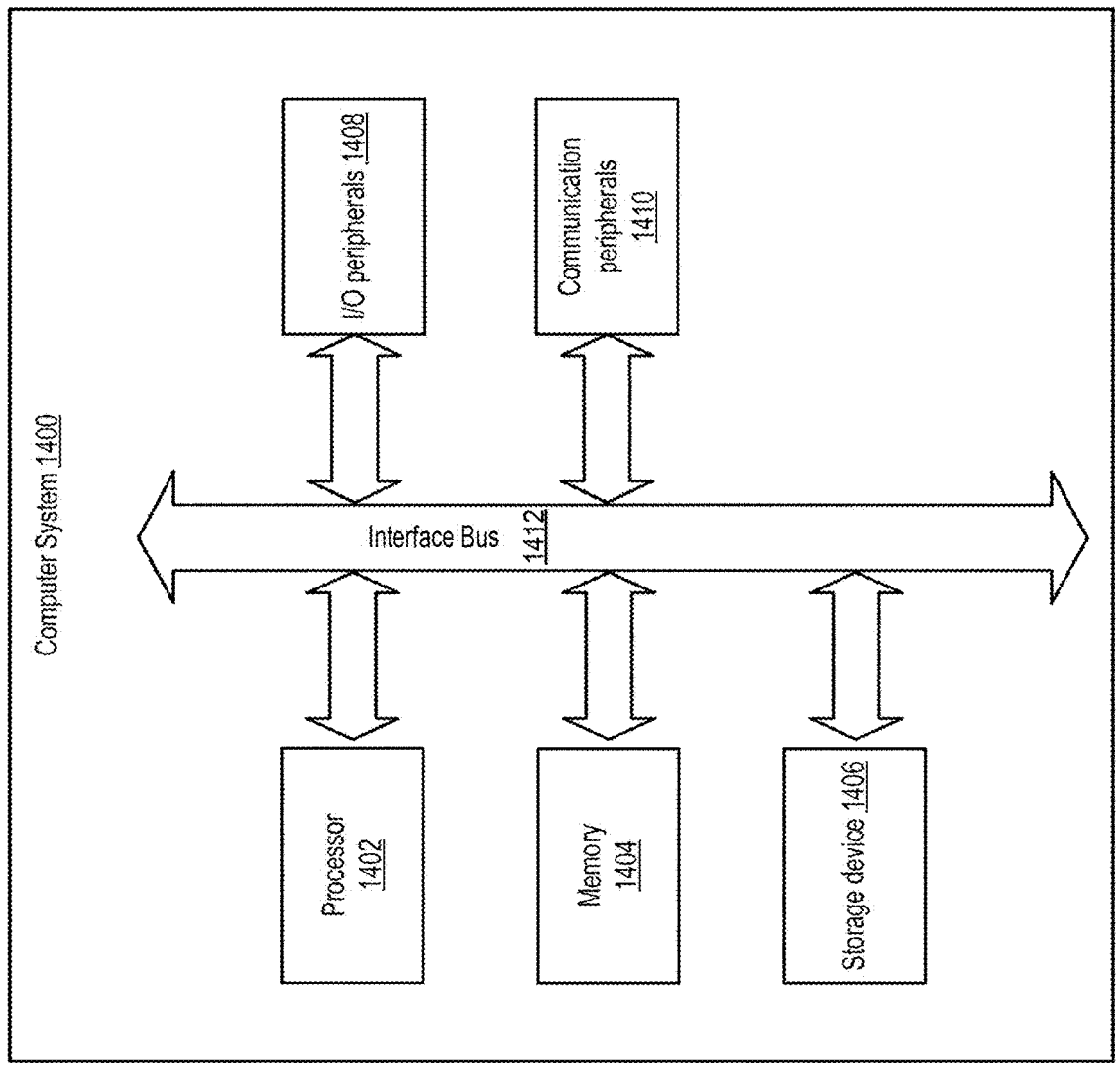
FIG. 14 illustrates an example of a computer system for implementing some of the embodiments disclosed herein.

FIG. 14 illustrates an example of a computer system 1400 for implementing some of the embodiments disclosed herein. Computer system 1400 may have a distributed architecture, where some of the components (e.g., memory and processor) are part of an end user device and some other similar components (e.g., memory and processor) are part of a computer server. Computer system 1400 includes at least a processor 1402, a memory 1404, a storage device 1406, input/output (I/O) peripherals 1408, communication peripherals 1410, and an interface bus 1412. Interface bus 1412 is configured to communicate, transmit, and transfer data, controls, and commands among the various components of computer system 1400. Processor 1402 may include one or more processing units, such as CPUs, GPUs, TPUs, systolic arrays, or SIMD processors. Memory 1404 and storage device 1406 include computer-readable storage media, such as RAM, ROM, electrically erasable programmable read-only memory (EEPROM), hard drives, CD-ROMs, optical storage devices, magnetic storage devices, electronic non-volatile computer storage, for example, Flash® memory, and other tangible storage media. Any of such computer-readable storage media can be configured to store instructions or program codes embodying aspects of the disclosure. Memory 1404 and storage device 1406 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with computer system 1400.

Further, memory 1404 includes an operating system, programs, and applications. Processor 1402 is configured to execute the stored instructions and includes, for example, a logical processing unit, a microprocessor, a digital signal processor, and other processors. Memory 1404 and/or processor 1402 can be virtualized and can be hosted within another computing system of, for example, a cloud network or a data center. I/O peripherals 1408 include user interfaces, such as a keyboard, screen (e.g., a touch screen), microphone, speaker, other input/output devices, and computing components, such as graphical processing units, serial ports, parallel ports, universal serial buses, and other input/output peripherals. I/O peripherals 1408 are connected to processor 1402 through any of the ports coupled to interface bus 1412. Communication peripherals 1410 are configured to facilitate communication between computer system 1400 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
    accessing a pre-trained machine-learning model, the pre-trained machine-learning model including a set of parameter values corresponding to a set of parameters, wherein the set of parameter values were learned using a first training data set, the first training data set including a plurality of images and a corresponding set of classifications, each classification of the set of classifications characterizing a depiction in a corresponding image of the plurality of images;
    accessing a set of digital pathology images and a corresponding set of artifact classifications, wherein each digital pathology image of the set of digital pathology images depicts a stained section of a sample and further includes an artifact, and wherein each artifact classification of the set of artifact classifications indicates a type of artifact corresponding to the artifact, wherein the set of classifications of the first training data set is different than the set of artifact classifications;
    using few-shot learning to further train the pre-trained machine-learning model using the set of digital pathology images and the corresponding set of artifact classifications, wherein the further training generates a new set of parameter values for the set of parameters;
    receiving a new digital pathology image;
    processing the new digital pathology image using the further trained machine-learning model to generate an output predicting that the new digital pathology image includes a particular type of artifact;
    determining a portion of the new digital pathology image that depicts the particular type of artifact; and
    excluding the portion of the new digital pathology image from a subsequent digital pathology analysis.

2. The method of claim 1, wherein the set of artifact classifications does not include the particular type of artifact.

3. The method of claim 1, wherein using few-shot learning to further train the pre-trained machine-learning model includes generating, for each artifact classification of the set of artifact classifications, a similarity metric using the new digital pathology image and a representation of the artifact classification generated based on a subset of the set of digital pathology images associated with the artifact classification.

4. The method of claim 1, wherein a particular artifact classification of the set of artifact classifications indicates that a corresponding digital pathology image does not include an artifact.

5. The method of claim 1, wherein a number of artifact classifications of the set of artifact classifications is less than a number of classifications of the first training data set.

6. The method of claim 1, wherein a digital pathology image of the set of digital pathology images depicts a tissue section stained using an Immunohistochemistry (IHC) staining protocol, and wherein the tissue section corresponding to the digital pathology image includes one or more biomarkers.

7. The method of claim 1, wherein a digital pathology image of the set of digital pathology images depicts a tissue section stained using an hematoxylin and eosin (H&E) staining protocol, and wherein the tissue section corresponding to the digital pathology image includes one or more biological objects.

8. The method of claim 1, wherein, for each image of at least 50% of the plurality of images, the image depicts macroscopic objects, and wherein, for each digital pathology image of the set of digital pathology images, the digital pathology image depicts microscopic objects.

* * * * *